(12) United States Patent
Kim et al.

(10) Patent No.: US 11,202,441 B2
(45) Date of Patent: Dec. 21, 2021

(54) PET EXERCISE APPARATUS AND PET EXERCISE SYSTEM

(71) Applicant: Dae-Yong Kim, Seoul (KR)

(72) Inventors: Dae-Yong Kim, Seoul (KR); Seung-Hee Son, Seoul (KR)

(*) Notice: Subject to any disclaimer, the term of this patent is extended or adjusted under 35 U.S.C. 154(b) by 0 days.

(21) Appl. No.: 16/649,459

(22) PCT Filed: Sep. 21, 2018

(86) PCT No.: PCT/KR2018/011242
§ 371 (c)(1),
(2) Date: Mar. 20, 2020

(87) PCT Pub. No.: WO2019/059710
PCT Pub. Date: Mar. 28, 2019

(65) Prior Publication Data
US 2020/0275636 A1 Sep. 3, 2020

(30) Foreign Application Priority Data

Sep. 22, 2017 (KR) .......................... 10-2017-0122761
Oct. 20, 2017 (KR) .......................... 10-2017-0136731
(Continued)

(51) Int. Cl.
*A01K 15/02* (2006.01)
*F21V 33/00* (2006.01)

(52) U.S. Cl.
CPC .......... *A01K 15/027* (2013.01); *F21V 33/008* (2013.01)

(58) Field of Classification Search
CPC .... A01K 15/02; A01K 15/027; A01K 15/021; A01K 15/00; F21W 2131/30
See application file for complete search history.

(56) References Cited

U.S. PATENT DOCUMENTS 4,088,094 A * 5/1978 Howard ............... A01K 15/027
119/700
6,500,097 B1 * 12/2002 Hall ....................... A63B 19/04
482/51
(Continued)

FOREIGN PATENT DOCUMENTS

JP 2000201563 7/2000
JP 2008237076 10/2008
(Continued)

*Primary Examiner* — Leah Simone Macchiarolo
(74) *Attorney, Agent, or Firm* — IPLA P.A.

(57) ABSTRACT

A pet exercise apparatus includes: a base module; a running module which has an exercise space formed therein in an axial direction and an inner circumferential surface or outer circumferential surface rotatably coupled to the base module; and an LED module provided in the base module or the running module to irradiate LED light to the exercise space. The pet exercise system may further includes: a rotary module which has an exercise space part formed therein as a space in which the pet may exercise and a gaze inducing part provided on an inner circumferential surface and inducing a pet's gaze so that the pet continuously moves in the exercise space part and may exercise; a support module supporting the rotary module so that the rotary module is rotatable according to the motion of the pet; a control module controlling an operation of the gaze inducing part; and a terminal including a communication part transmitting an operation control signal CI of the gaze inducing part to be transmitted to the control module.

1 Claim, 33 Drawing Sheets

(30) Foreign Application Priority Data

Dec. 19, 2017 (KR) .......................... 10-2017-0175565
Feb. 14, 2018 (KR) .......................... 10-2018-0018743
Jun. 18, 2018 (KR) .......................... 10-2018-0069782
Sep. 13, 2018 (KR) .......................... 10-2018-0109471

(56) References Cited

U.S. PATENT DOCUMENTS

| | | | | |
|---|---|---|---|---|
| 8,161,913 B1* | 4/2012 | Barfield | ............... | A01K 15/027 |
| | | | | 119/700 |
| 2008/0141946 A1 | 6/2008 | Kalani | | |
| 2011/0162586 A1* | 7/2011 | Ho | ...................... | A01K 15/027 |
| | | | | 119/704 |
| 2011/0283953 A1* | 11/2011 | Forest | ................ | F21V 33/0004 |
| | | | | 119/704 |
| 2012/0024237 A1* | 2/2012 | Rice | .................... | A01K 15/027 |
| | | | | 119/703 |
| 2019/0141955 A1* | 5/2019 | Dharmesh | ............ | A01K 15/027 |
| | | | | 119/703 |
| 2019/0191667 A1* | 6/2019 | Harada | ................ | A01K 15/027 |

FOREIGN PATENT DOCUMENTS

KR      20030068099      8/2003
KR      200465073      1/2013

\* cited by examiner

501: L1, L2, L3...

501 : L1, L2, L3...

407

● : Gaze inducing part on
○ : Gaze inducing part off

● : Gaze inducing part on
○ : Gaze inducing part off

● : Gaze inducing part on
○ : Gaze inducing part off

2501 : L1, L2, L3...

2307

PET EXERCISE APPARATUS AND PET EXERCISE SYSTEM

BACKGROUND

The present invention relates to a pet exercise apparatus and a pet exercise system.

This application claims priority to and the benefit of Korean Patent Application No. 10-2017-0122761 filed in the Korean Intellectual Property Office on Sep. 22, 2017, Korean Patent Application No. 10-2017-0136731 filed in the Korean Intellectual Property Office on Oct. 20, 2017, Korean Patent Application No. 10-2017-0175565 filed in the Korean Intellectual Property Office on Dec. 19, 2017, Korean Patent Application No. 10-2018-0018743 filed in the Korean Intellectual Property Office on Feb. 14, 2018, Korean Patent Application No. 10-2018-0069782 filed in the Korean Intellectual Property Office on Jun. 18, 2018, and Korean Patent Application No. 10-2018-0109471 filed in the Korean Intellectual Property Office on Sep. 13, 2018, the entire contents described in the specification and drawings of this application are incorporated herein by reference.

In recent years, the number of single- or two-person one-home units has increased.

Therefore, there is a trend that a large number of single- or two-person one-home units are adopting and raising pets to ease loneliness, and the pets are also very helpful in improving children's emotions, and now the number of families raising pets for various reasons is rapidly increasing.

On the other hand, if the pets were a means of people's enjoyment or need in the past, the perception of the pets is now changing as a friend or a member of the family, and more and more people are interested in the health of the pets, but in the room, the space is small and various objects are arranged, and as a result, many restrictions are imposed on the exercise of the pets animal for the health of the pets.

On the other hand, as prior art for solving the above problems, Korean Registered Utility Model No. 20-0465073 (registered on Jan. 28, 2013) discloses "Breeding Device for Pet with Movement Facility".

The Korean Registered Utility Model has an advantage in that the breeding device includes a cylindrical breeding barrel body 11 with a receiving part 11a formed therein so that a pet is bred, a breeding barrel 10 constituted by a disc-shaped blocking wall 12 formed on one side of the receiving part 11a so as to block one surface of the breeding barrel body 11, and a rotating shaft rod 21 connected to the center of the blocking wall 12 so as to exercise the pet by rotation of the breeding barrel 10, and as a result, the pet can exercise in a receiving space 11a of the breeding barrel 10 even in a narrow space in the room.

However, the Korean Registered Utility Model has a disadvantage in that since a mean for attracting the interest of the pet is not provided, the companion cannot be continuously exercised for a long time and a health status of the pet cannot be checked in real time.

SUMMARY OF THE INVENTION

A technical object to be achieved by the present invention is to enable a pet to exercise while continuously moving inside a rotary module for a long time by inducing the gaze of the pet or attracting the interest of the pet inside an exercise space part formed inside the rotary module.

Further, an object of the present invention is to further increase the interest of the pet which exercises while moving inside the rotary module by controlling a gaze inducing part of the rotary module by an operation control signal of the gaze inducing part inputted through a terminal.

Further, an object of the present invention is to conveniently check exercise information (information on rotational speed, rotating distance, the number of turns, and the like of the rotary module) of the pet by allowing a user to check motion data of the rotary module through the terminal.

Further, an object of the present invention is to adjust an optimal position for emitting light by the gaze inducing part according to a state of the pet by sensing the pet that enters/exits the inside of the exercise space part and controlling an emission position or an emission range of the gaze inducing part according to an entering/exiting signal of the pet.

Further, an object of the present invention is to enable the pet to exercise with more focus inside the exercise space part by sensing the pet that enters/exits the inside of the exercise space part and operating an interest attracting part attracting the interest of the pet depending on the gaze inducing part controlled according to the entering/exiting signal of the pet.

According to an aspect of the present invention, a pet exercise apparatus is characterized to include a base module; a running module which has an exercise space formed therein in an axial direction and an inner circumferential surface or outer circumferential surface rotatably coupled to the base module; and an LED module provided in the base module or the running module to irradiate LED light to the exercise space.

Further, there is provided a pet exercise apparatus comprising: a running module including a pet exercise space part formed therein and a gaze inducing part provided on the inner circumferential surface to induce the gaze of the pet; and a support module supporting the running module so that the running module is rotatable according to the motion of the pet.

Further, there is provided a pet exercise apparatus comprising: a running module including a pet exercise space part formed therein and a light emitting part transmitting light so that a gaze inducing image is formed at a predetermined position in the exercise space part; and a support module supporting the running module so that the running module is rotatable according to the motion of the pet.

Further, there is provided a pet exercise apparatus comprising: a rotary housing which has an exercise space part formed therein so that the pet may exercise and has a light discharge hole; a support housing covering an outside of the rotary housing; a rotary support member provided between the rotary housing and the support housing to support the rotational motion of the rotary housing; and a light emitting module that transmits light to the inside of the rotary housing through the light discharge hole.

Further, there is provided a pet exercise apparatus comprising: a rotary housing having a pet exercise space part formed therein and formed in a curved surface; a support housing covering an outside of the rotary housing; a display part blocking one sides of the rotary housing and the support housing and provided with a gaze inducing part inducing a pet's gaze; and a rotary support member provided between the rotary housing and the support housing and supporting the rotational motion of the rotary housing.

Further, there is provided a pet exercise apparatus comprising: a rotary module which has an exercise space part formed therein as a space in which the pet may exercise and a gaze inducing part provided on an inner circumferential surface and inducing a pet's gaze so that the pet continuously moves in the exercise space part and may exercise; a support module supporting the rotary module so that the rotary module is rotatable according to the motion of the pet; a control module controlling an operation of the gaze inducing part; and a terminal including a communication part transmitting an operation control signal CI of the gaze inducing part to be transmitted to the control module.

Further, there is provided a pet exercise apparatus comprising: a rotary module which has an exercise space part formed therein as a space in which the pet may exercise and a gaze inducing part provided on an inner circumferential surface thereof and inducing a pet's gaze so that the pet continuously moves in the exercise space part and may exercise; a support module supporting the rotary module so that the rotary module is rotatable according to the motion of the pet; a control module controlling an operation of the gaze inducing part; and a terminal including a display part receiving and displaying motion data MD of the rotary module.

Further, there is provided a pet exercise apparatus comprising: a running module which includes an exercise space part formed therein as a space in which the pet may exercise and a gaze inducing part provided on an inner circumferential surface thereof and inducing a gaze of the pet while emitting light by itself so that the pet continuously moves in the exercise space part and may exercise; a support module supporting the running module so that the running module is rotatable according to the motion of the pet; and a sensing module provided in the running module or the support module and sensing the pet entering/exiting the exercise space part.

According to an embodiment of the present invention, it is possible for a pet to exercise while continuously moving inside a rotary module for a long time by inducing the gaze of the pet or attracting the interest of the pet inside an exercise space part formed inside the rotary module.

Further, it is possible further increase the interest of the pet which exercises while moving inside the rotary module by controlling a gaze inducing part of the rotary module by an operation control signal of the gaze inducing part inputted through a terminal.

Further, it is possible to conveniently check exercise information (information on rotational speed, rotating distance, the number of turns, and the like of the rotary module) of the pet by allowing a user to check motion data of the rotary module through the terminal.

Further, it is possible to adjust an optimal position for emitting light by the gaze inducing part according to a state of the pet by sensing the pet that enters/exits the inside of the exercise space part and controlling an emission position or an emission range of the gaze inducing part according to an entering/exiting signal of the pet.

Further, it is possible for the pet to exercise with more focus inside the exercise space part by sensing the pet that enters/exits the inside of the exercise space part and operating an interest attracting part attracting the interest of the pet depending on the gaze inducing part controlled according to the entering/exiting signal of the pet.

EXPLANATION OF REFERENCE NUMERALS AND SYMBOLS

Figure 1:
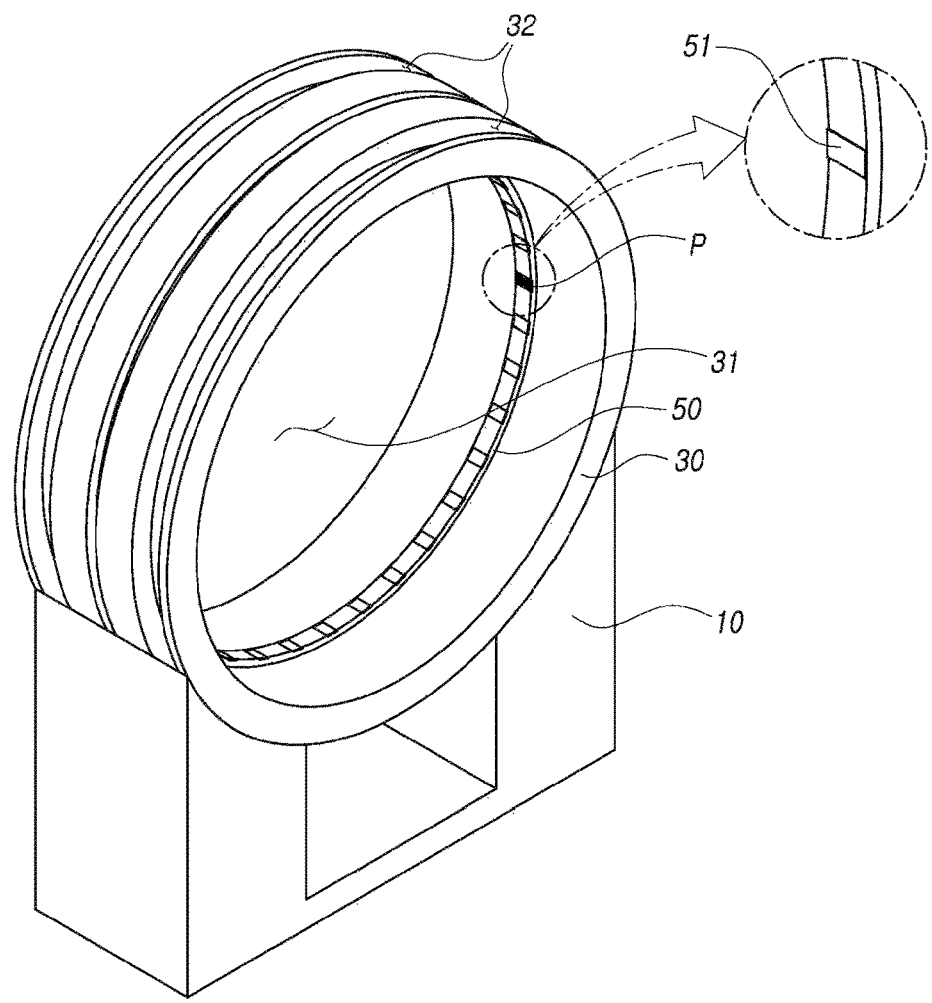
FIG. 1 is a perspective view of a pet exercise apparatus according to an embodiment of the present invention.

| | |
|---|---|
| 10: Base module | 11: Speed limiting part |
| 12: Extension frame | 30: Running module |
| 31: Exercise space | 32: Guide groove |
| 50: LED module | 51: LED light source |
| 60: LED module | 400: Pet exercise apparatus |
| 401: Exercise space part | 403: Gaze inducing part |
| 405: Running module | 407: Support module |
| 501: Light emitting module | 701: Light emitting module |
| 703: Light source | 801: Weight measuring part |
| 803: Speaker part | 805: Communication part |
| 900: Pet exercise apparatus | 901: Gaze inducing image |
| 903: Light emitting part | 905: Running module |
| 1000: Pet exercise apparatus | 1001: Exercise space part |
| 1003: Light discharge hole | 1005: Rotary housing |
| 1007: Support housing | 1101: Rotary support member |
| 1103: Striking part | 1105: Light generating part |
| 1200: Light emitting module | 1201: Case part |
| 1203: Light emitting medium part | 1303: Luminescent floating body |
| 1300: Light emitting module | 1307: Liquid |
| 1301: Tube | 1503: Light source part |
| 1305: Pressure adjusting part | 1603: Gaze inducing part |
| 1401: Light source part | 1607: Support module |
| 1500: Light emitting module | 1611: Display part |
| 1501: Optical fiber line part | 1703: Speaker part |
| 1601: Exercise space part | 1707: Roller |
| 1605: Running module | 1803: Rotary housing |
| 1609: Main body part | 1807: Gaze inducing part |
| 1701: Weight measuring part | 1811: Rotary support member |
| 1705: Communication part | 1905: Running module |
| 1801: Exercise space part | 1909: Plate part |
| 1805: Support housing | 2101: Control module |
| 1809: Display part | 2303: Gaze inducing part |
| 1903: Gaze inducing part | 2307: Support module |
| 1907: Main body part | 2401: Control module |
| 2001: Control module | 2405: Weight measuring part |
| 2201: Control module | 2409: Communication part |
| 2300, 2300': Pet exercise system | 2501: Light emitting module |
| 2301: Exercise space part | 2703: Light source |
| 2305: Rotary module | 3103: Gaze inducing part |
| 2309: Terminal | 3107: Support module |
| 2403: Communication part | 3301: Communication part |
| 2407: Speaker part | |
| 2411: Display part | |
| 2701: Light emitting module | |
| 3101: Exercise space part | |
| 3105: Running module | |
| 3109: Gaze inducing part control module | |
| 3111: Interest attracting part | |
| 3113: Interest attracting part control module | |
| 3201: Sensing module | |
| 3203: Wheel part | |

DETAILED DESCRIPTION OF THE INVENTION

As illustrated in FIGS. 1 to 15, a pet exercise apparatus according to an embodiment of the present invention is configured to include a base module 10; a running module 30 which has an exercise space 31 formed in an axial direction therein and an inner or outer circumferential surface rotatably coupled to the base module 10; and an LED module 50 provided in the base module 10 or the running module 30 to irradiate LED light to the exercise space 31 of the running module 30.

In addition, the embodiment of the present invention further includes a communication module to be interlocked with a portable terminal.

The base module 10 is provided on a bottom surface to support the running module 30 from the bottom surface, and the outer circumferential surface of the running module 30 is rotatably coupled to the base module 10.

In the base module 10, a lower surface in close contact with the bottom surface is formed in a substantially planar shape, and an upper surface in close contact with the outer circumferential surface of the running module 30 is concavely recessed to correspond to the outer circumferential surface of the running module 30.

Further, the base module 10 includes a speed limiting part 11.

The speed limiting part 11 rotates in close contact with the outer circumferential surface or inner circumferential surface of the running module 30, and the speed limiting part 11 supports the running module 30 and controls a rotational speed of the running module 30.

In addition, the speed limiting part 11 may be rotated by receiving external power so that the running module 30 rotates at a constant speed.

More specifically, the speed limiting part 11 is rotatably provided at one end of an extension frame 12 that protrudes upward from the upper surface of the base module 10 to be rotated in close contact with any one side of a guide groove 32 to be recessed along a circumferential direction of the running module 30.

In addition, the rotational speed may be variously varied by a structure in which a plurality of gears (not illustrated) having different sizes are rotated by engaging with each other, and as a result, the speed limiting part 11 may variously control the rotational speed of the running module 30 by this structure.

Of course, the rotational speed may be controlled by various structures in addition to the above-described gear structure, and as a result, the speed limiting part 30 may control the rotational speed of the running module 30.

The speed limiting part 11 may be provided with a rubber or silicone friction member on the outside so that the frictional force with the running module 30 is increased, and a plurality of friction members at front, rear, left, and right sides may be provided to support the running module more stably.

In addition, the base module 10 is provided with a weight sensor that may sense the weight of a pet therein, and such a weight sensor may output the weight of the pet to a user terminal by a communication module to be described below.

The running module 30 is provided in a hollow cylindrical shape in which the exercise space 31 in which the pet may exercise is through-formed in the axial direction, a plurality of modules are provided to be assembled, and the exercise space 31 is formed therein during assembling.

The running module 30 is recessed inward in a radial direction on the outer circumferential surface, and a plurality of guide grooves 32 spaced apart from each other in the axial direction are formed.

The plurality of guide grooves 32 are recessed along a circumferential direction on the outer circumferential surface of the running module.

The guide groove 32 is rotatably coupled to the base module.

The running module 30 is provided with a mat on the inner circumferential surface that prevents the pet from slipping and serves as a cushion.

The LED module 50 may be provided on the base module 10 or the running module 30, and in an embodiment of the present invention, the LED module 50 is provided on the inner circumferential surface of the running module 30.

The LED module 50 is provided in a substantially circular strip shape and provided on the inner circumferential surface of the running module 30, and such an LED module 50 is provided with a plurality of LED light sources 51 along a longitudinal direction.

The LED module 50 irradiates the LED light to the inside the running module 30 to attract or induce the interest of the pet, and as an example, the LED module 50 may irradiate the LED light to only one point P in a 3-o'clock or 9-o'clock direction so that the pet watches any one point through a program.

The LED module 50 may be controlled by an application installed in the user's portable terminal, and, of course, may output various lights that produce motions of fish and mice in addition to simple lighting.

In other words, the LED module 50 may control positions, shapes, colors, etc. to be irradiated through the application of the user's portable terminal.

In addition, the LED module 50 may be operated by a power supply part (not illustrated) provided in the base module 10 or the running module 30, and the power supply part may be charged through various charging means, for example, may be wirelessly charged through a wireless charging circuit.

Figure 3:
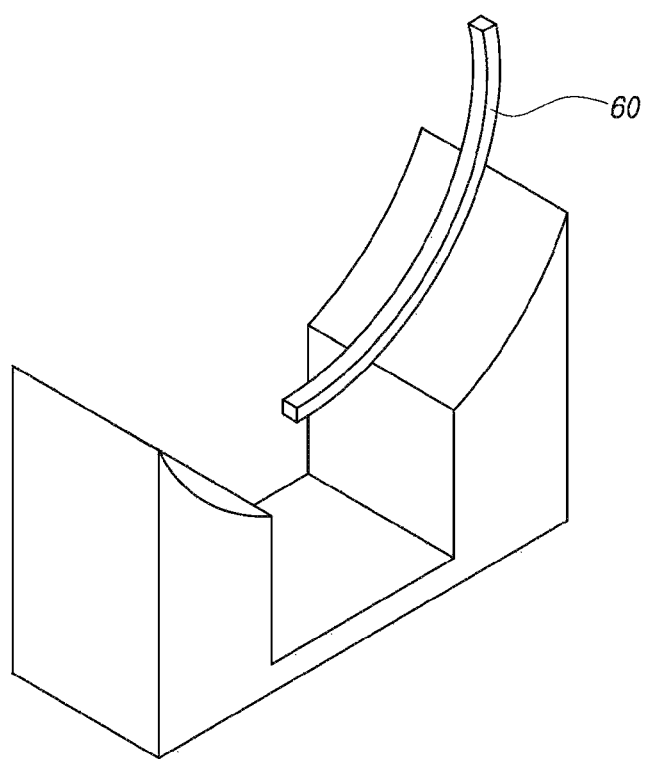
FIG. 3 is a view for describing another embodiment of an LED module of FIG. 1.
Figure 4:
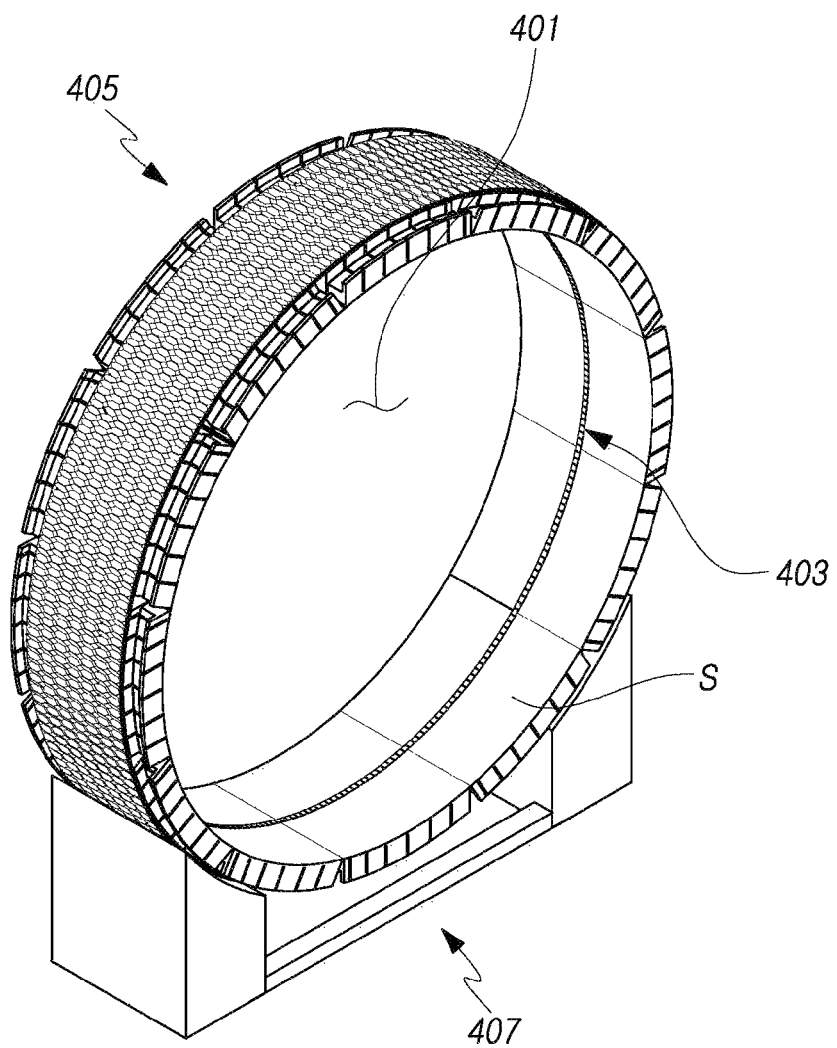
FIG. 4 is a perspective view of a pet exercise apparatus according to another embodiment of the present invention.

Meanwhile, referring to FIG. 3, an LED module 60 according to another embodiment of the present invention may be provided in an arc-shaped strip shape, and the LED module 60 is provided in the base module 10 to irradiate LED light to the exercise space 31 of the running module 30.

Meanwhile, the embodiment of the present invention may include a speaker (not illustrated), which may output sounds including various animal sounds such as mice and fish so as to induce interest of the pet.

Further, a pet exercise apparatus 400 according to yet another embodiment of the present invention includes a running module 405 including a pet exercise space part 401 formed therein and a gaze inducing part 403 provided on the inner circumferential surface to induce the gaze of the pet; and a support module 407 supporting the running module 405 so that the running module 405 is rotatable according to the motion of the pet.

The running module 405 includes the pet exercise space part 401 formed therein.

As an example, the running module 405 is formed in an overall ring shape, and an inner space thereof is provided with the pet exercise space part 401.

More specifically, a pet such as cat may exercise through a motion such as running or walking along an inner circumferential surface S of the running module 405 in the exercise space part 401, which is the inner space of the running module 405.

The running module 405 includes the gaze inducing part 403 that induces the pet's gaze, and the gaze inducing part 403 is provided on the inner circumferential surface of the running module 405.

Hereinafter, various modified embodiments of the gaze inducing part 403 will be described.

First, the gaze inducing part 403 includes light emitting modules 501 and 701 that emit light at a predetermined position or variable position on the inner circumferential surface of the running module 405, regardless of the rotational motion of the running module 405.

Here, the light emitting module 501 includes lighting members L1, L2, L3, etc. emitting the light by power.

More specifically, the lighting members L1, L2, L3, etc. are provided as LEDs in which light is emitted by the supplied power.

Figure 5:
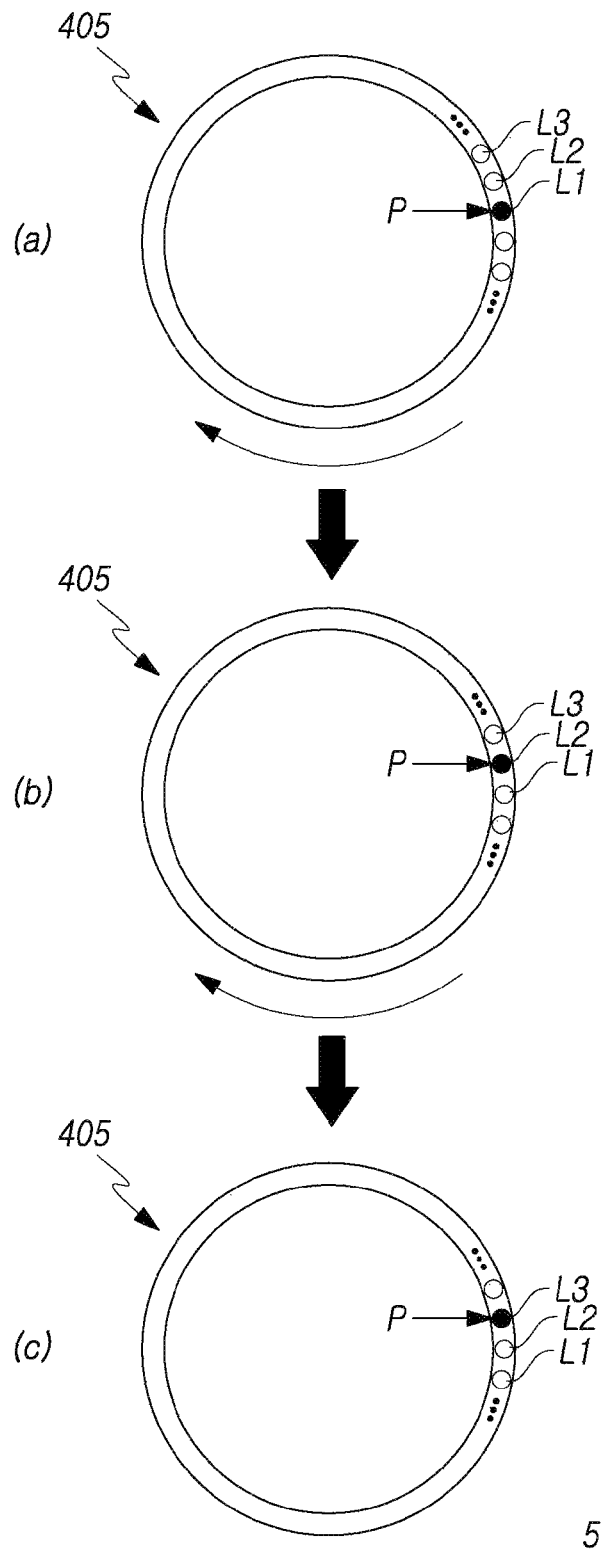
FIGS. 5 and 6 are views for describing an operation example of a running module of FIG. 4.
Figure 6:
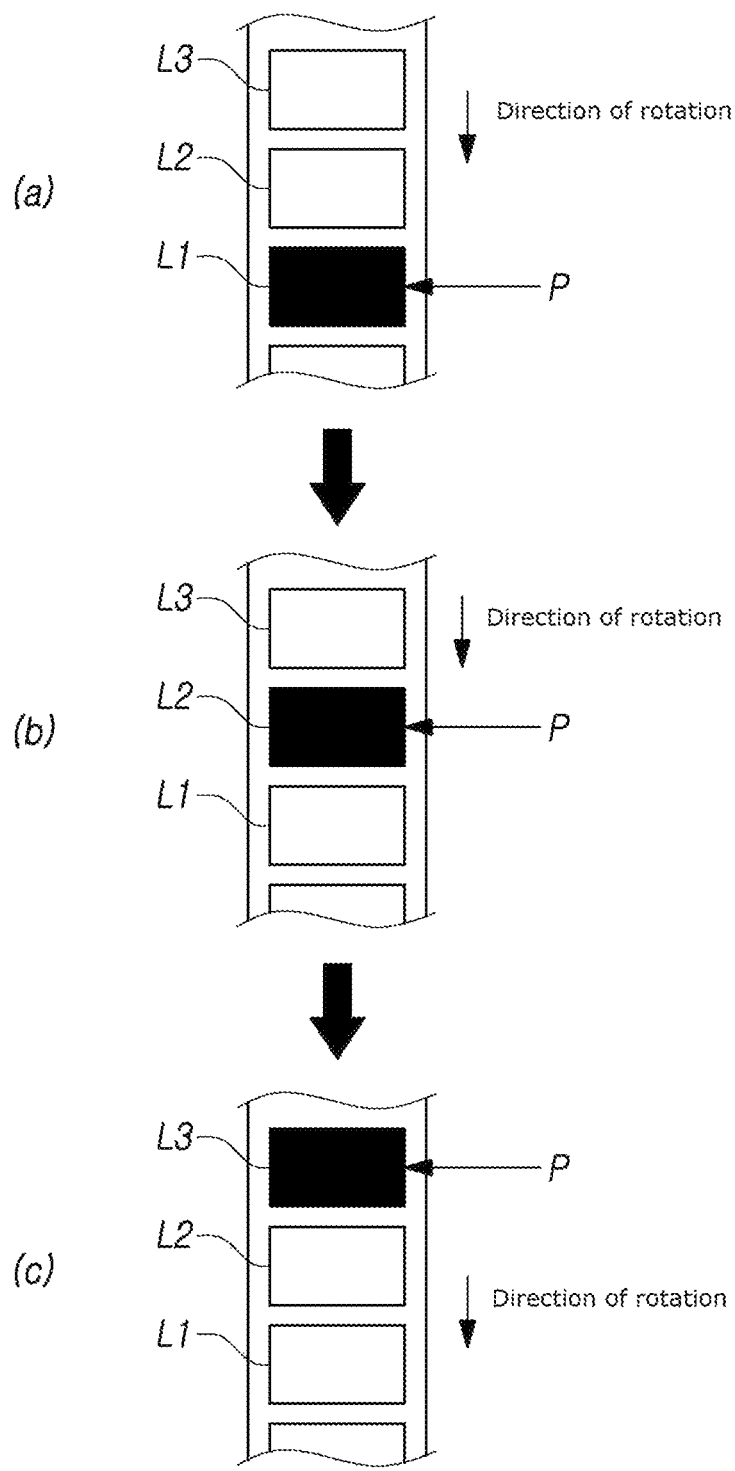

As illustrated in FIGS. 5 and 6, the lighting members L1, L2, L3, etc. are turned on sequentially in an opposite direction to the rotation direction of the running module 405 depending on the rotational speed as the running module 405 rotates.

That is, as illustrated in FIGS. 5 and 6A, the lighting member L1 is turned on at the predetermined position P on the inner circumferential surface of the running module 405, and after the running module 405 rotates at a predetermined angle clockwise (FIGS. 5 and 6B), the lighting member L1 is turned off, the adjacent lighting member L2 is turned on, and then after the running module 405 rotates at a predetermined angle clockwise (FIGS. 5 and 6C), the lighting member L2 is turned off and the adjacent lighting member L3 is turned on.

Even if the running module 405 rotates as the pet moves in the running module 405 by the turn-on or turn-off of the lighting members L1, L2, L3, etc., the light is continuously emitted at the predetermined position P on the inner circumferential surface of the running module 405 so that the pet continuously moves by targeting the light and may exercise.

Of course, although not illustrated in the drawings, a controller is provided in the pet exercise apparatus 400 to control the turn-on or turn-off operation of the lighting members L1, L2, L3, etc. according to the rotational speed of the running module 405, so that the lighting members L1, L2, L3, etc. are turned on or off depending on the rotation movement (rotational speed) of the running module 405.

Meanwhile, in addition to the above-described content, the predetermined position P of the inner circumferential surface of the running module 405 may also be varied.

That is, according to yet another embodiment of the present invention, as the position of the lighting member L1, L2, L3, etc. to be turned on is varied, the predetermined position P of the inner circumferential surface of the running module 405 may also be varied.

Meanwhile, unlike those described above, the light emitting module 701 may also include reflective members M1, M2, M3, etc. that reflect incident light to emit the light.

More specifically, the reflective members M1, M2, M3, etc. are provided as mirrors reflecting light incident from the light source 703.

Figure 7:
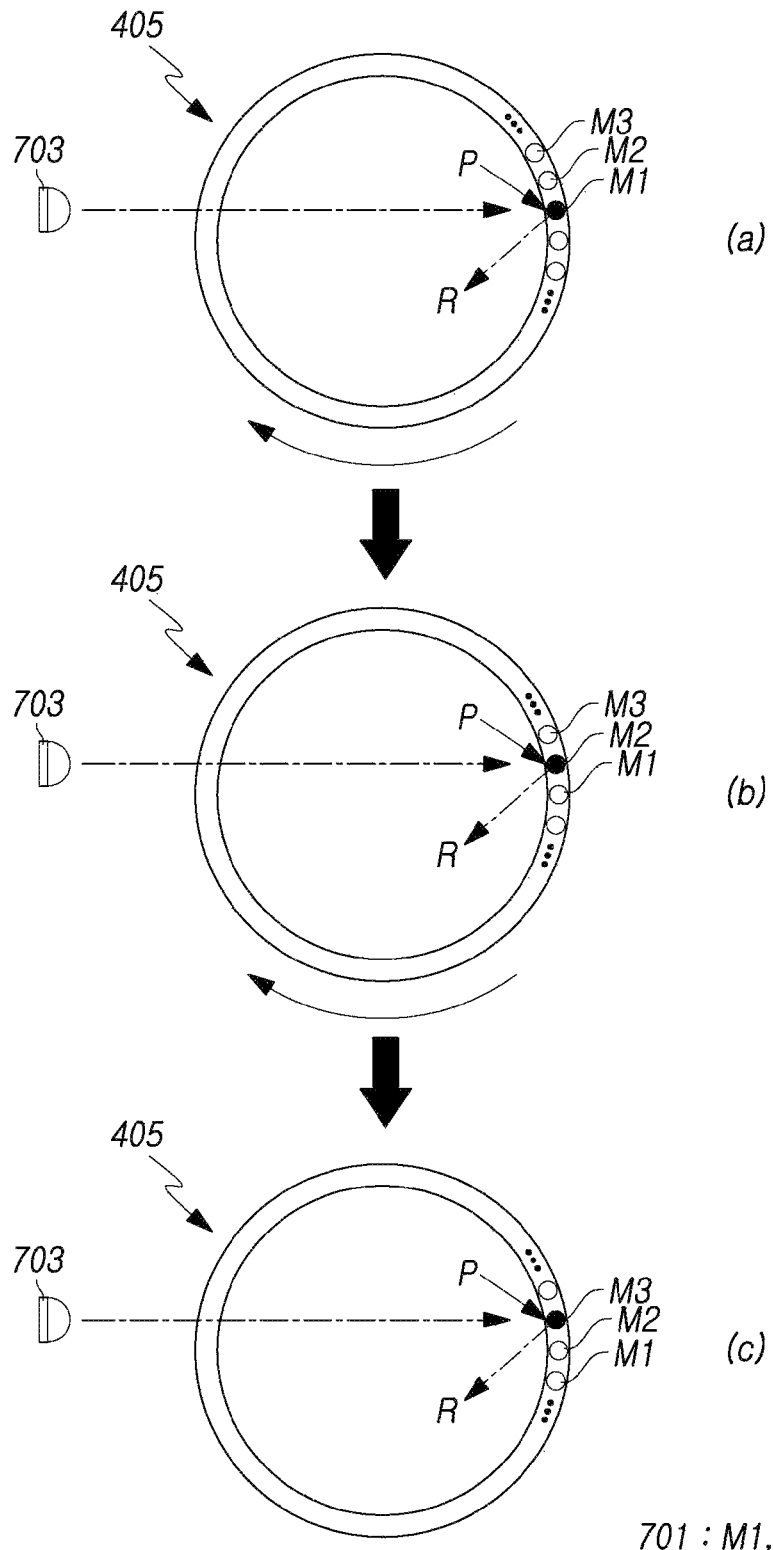
FIG. 7 is a view for describing an operation example of a running module in a pet exercise apparatus according to yet another embodiment of the present invention.
Figure 8:
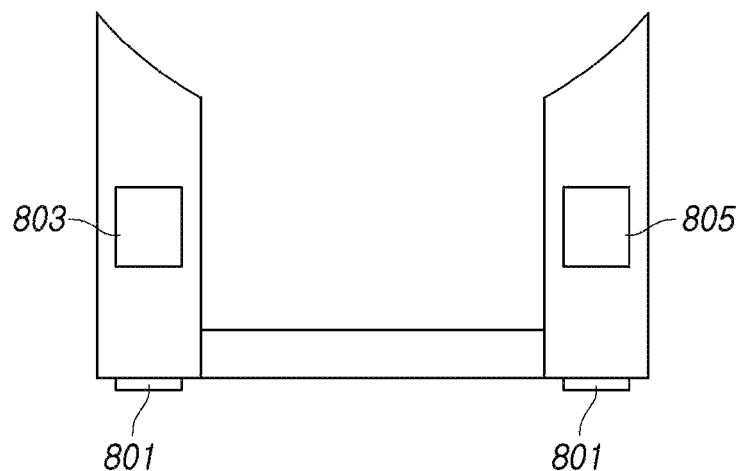
FIG. 8 is a view for describing a support module of FIG. 4.

As illustrated in FIG. 7, the reflective members M1, M2, M3, etc. are continuously arranged in a circumferential direction along the inner circumferential surface of the running module 405, and thus, as the running module 405 rotates, the reflective members M1, M2, M3, etc. passing through the predetermined position P of the inner circumferential surface of the running module 405 reflect the light incident from the light source 703 (reflected light R) and serves as a target for focusing the interest of the pet.

Of course, here, the light source 703 may be provided as, for example, a laser light source, and according to another embodiment of the present invention, the predetermined position P of the inner circumferential surface of the running module 405 may also be varied by a position change, an angle change, etc., of the light source 703.

Subsequently, the support module 407 supports the running module 405 such that the running module 405 is rotatable according to the motion of the pet.

In addition, the support module 407 includes a weight measuring part 801, and the weight measuring part 801 is provided to measure the weight of the pet exercising in the running module 405.

The weight measuring part 801 is provided as, for example, a load cell.

In addition, the support module 407 includes a speaker part 803, and favorite music, sound, and the like of the pet may be transmitted, or a pet owner's voice may be transmitted by the speaker part 803.

In addition, the support module 407 includes a communication part 805, and by the communication part 805, a control signal transmitted from an external terminal is transmitted to the pet exercise apparatus 400, and the rotational speed of the running module 405, the pet's weight measured by the weight measuring part 801, and the like are transmitted to the external terminal.

In addition, the support module 407 may include the speed limiting part 11 included in the base module 10 described above.

Figure 2:
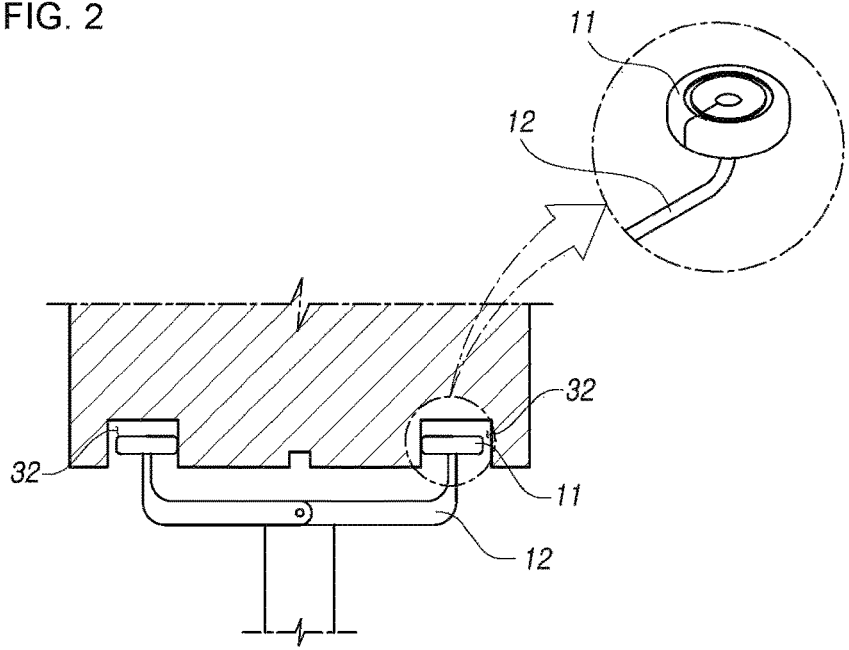
FIG. 2 is a partial cross-sectional view for describing a base module of FIG. 1.

At this time, the configuration of the speed limiting part 11, the coupling structure of the speed limiting part 11 and the running module 405, the corresponding structure, etc. are the same as the coupling structure of the speed limiting part 11 and the base module 10, the corresponding structure, etc. as illustrated in FIG. 2, and thus the detailed description will be omitted.

Further, a pet exercise apparatus 900 according to yet another embodiment of the present invention includes a running module 905 including a pet exercise space part 401 formed therein and a light emitting part 903 emitting light so that a gaze inducing image 901 is formed at a predetermined position of the pet exercise space part 401; and a support module 407 supporting the running module 905 so that the running module 905 is rotatable according to the motion of the pet.

The function, the configuration, etc. of the support module 407 may be referred to those described above, and thus the detailed description thereof will be omitted.

Subsequently, the running module 905 includes the pet exercise space part 401 formed therein.

As an example, the running module 905 is formed in an overall ring shape, and an inner space thereof is provided with the pet exercise space part 401.

More specifically, a pet such as cat may exercise through a motion such as running or walking along an inner circumferential surface of the running module 905 in the exercise space part 401, which is the inner space of the running module 905.

The running module 905 includes a light emitting part 903 that emits light so that the gaze inducing image 901 inducing the pet's gaze is formed at a predetermined position in the exercise space part 401.

That is, the light emitting part 903 allows the gaze inducing image 901, which is a hologram, to be formed at a predetermined position in the exercise space part 401 through light transmission.

The light emitting part 903 is provided on the inner circumferential surface of the running module 905.

The light emitting part 903 includes lighting members K1, K2, K3, etc., and T1, T2, T3, etc. that transmit light by the supplied power, so that the gaze inducing image 901 is formed as a hologram.

Here, the power supplied to the light emitting part 903 may be supplied through a rechargeable battery such as a battery.

Meanwhile, as an example, the lighting members K1, K2, K3, etc., and T1, T2, T3, etc. are provided as laser light sources in which laser light is emitted by the supplied power.

Figure 9:
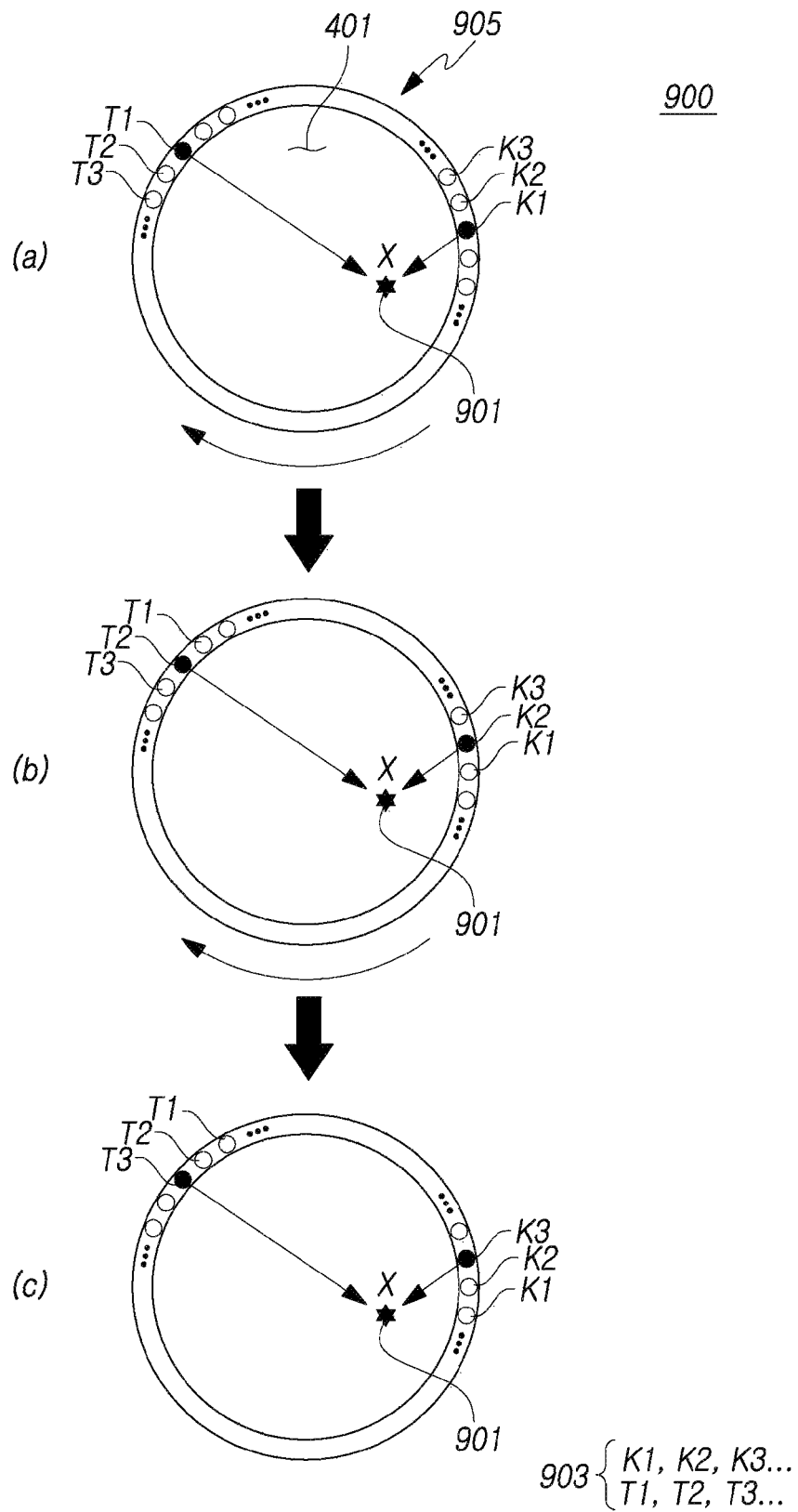
FIG. 9 is a view for describing an operation example of a running module in a pet exercise apparatus according to yet another embodiment of the present invention.
Figure 10:
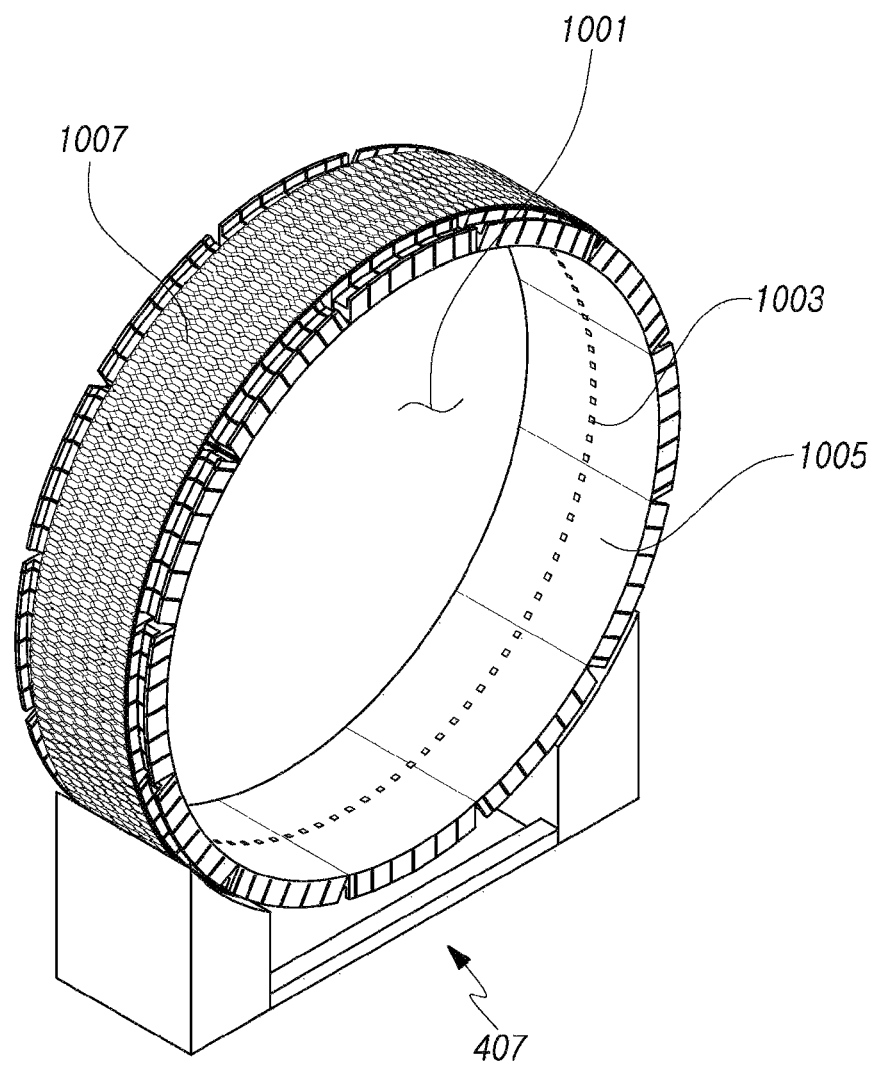
FIG. 10 is a perspective view of a pet exercise apparatus according to yet another embodiment of the present invention.

As illustrated in FIG. 9, the lighting members K1, K2, K3, etc., and T1, T2, T3, etc. are turned on sequentially in an opposite direction to the rotational direction of the running module 905 depending on the rotational speed as the running module 905 rotates to form the gaze inducing image 901.

That is, as illustrated in FIG. 9A, the lighting members K1 and T1 operate at a specific time point to form the gaze inducing image 901 at a predetermined position X in the exercise space part 401, and then after the running module 905 rotates at a predetermined angle clockwise (FIG. 9B), the lighting members K1 and T1 are turned off and the adjacent lighting members K2 and T2 are turned on, and after the running module 905 rotates at a predetermined angle clockwise again (FIG. 9C), the lighting members K2 and T2 are turned off and the adjacent lighting members K3 and T3 are turned on.

By the turn-on or off operation of these lighting members K1, K2, K3, etc., and T1, T2, T3, etc., even if the running module 905 rotates as the pet moves in the running module 905, the gaze inducing image 901 is continuously formed at the predetermined position X in the exercise space part 401, so that the pet continuously moves by targeting the gaze inducing image 901 and may exercise.

Of course, although not illustrated in the drawings, as such, a controller is provided in the pet exercise apparatus 900 to control the turn-on or turn-off operation of the lighting members K1, K2, K3, etc., and T1, T2, T3, etc. according to the rotational speed of the running module 905, so that the lighting members K1, K2, K3, etc., and T1, T2, T3, etc. are turned on or off depending on the rotation movement (rotational speed) of the running module 905.

Meanwhile, a pet exercise apparatus 1000 according to yet another embodiment of the present invention is characterized by including a rotary housing 1005 which has an exercise space part 1001 formed therein so that the pet may exercise; a support housing 1007 covering an outside of the rotary housing 1005; a rotary support member 1101 provided between the rotary housing 1005 and the support housing 1007 to support the rotation of the rotary housing 1005; and a light emitting module that transmits light to the inside of the rotary housing 1005 through a light discharge hole.

In FIGS. 11 to 15, in order to prevent confusion on the indication, one light discharge hole 1003 is indicated in the rotary housing 1005.

The rotary housing 1005 is provided in a ring shape as an example, and the exercise space part 1001 in which the pet may exercise is formed inside the rotary housing 1005.

Meanwhile, the light discharge hole 1003 is formed in the rotary housing 1005, and a plurality of light discharge holes 1003 are formed along the circumference in the center of the inner circumferential surface of the rotary housing 1005.

Through this light discharge holes 1003, light generated in the light emitting module to be described below is transmitted to the inside of the rotary housing 1005.

Subsequently, the support housing 1007 is provided to cover the outer side of the rotary housing 1005, and the rotary housing 1005 is also formed in a ring shape as an example.

Of course, the support housing 1007 is supported by the support module 407.

Subsequently, the rotary support member 1101 is provided between the rotary housing 1005 and the support housing 1007, and the rotary support member 1101 supports the rotational motion of the rotation housing 1005.

The rotating support member 1101 is formed, for example, by coupling rollers on both sides of the central axis.

Since the rotary support member 1101 is formed in such a structure, and a striking part 1103 illustrated in FIG. 11, a tube 1301 illustrated in FIG. 13, and an optical fiber line part 1501 illustrated in FIG. 15 to be described below do not interfere with the rotary support member 1101.

Subsequently, the light emitting module transmits the light to the inside of the rotary housing 1005 through the light discharge hole 1003.

These light emitting modules will be described with reference to respective drawings.

Figure 11:
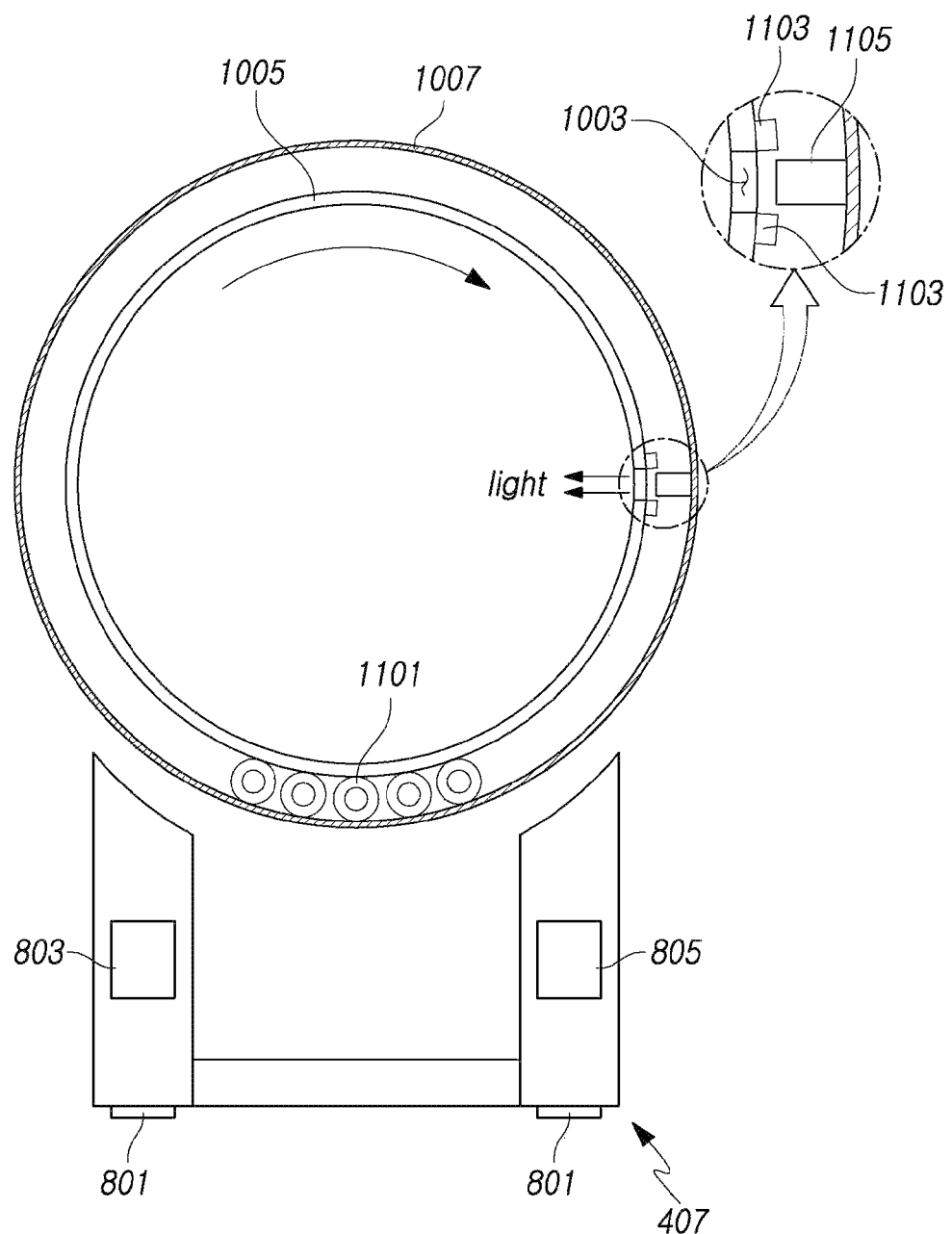
FIGS. 11 to 15 are views illustrating a pet exercise apparatus according to other embodiments of the present invention.

Referring to FIG. 11, a light emitting module 1100 includes a light generating part 1105 protruding from an inner circumferential surface of the support housing 1007; and a striking part 1103 protruding toward the support housing 1007 at a portion adjacent to the light discharge hole 1003 of the outer circumferential surface of the rotary housing 1005 and striking the light generating part 1105 when the rotary housing 1005 rotates to generate the light.

The light generating part 1105 is formed to protrude from the inner circumferential surface of the support housing 1007, and as an example, the light generating part 1105 is provided with a flint, such as a fire stick.

The striking part 1103 is formed to protrude toward the support housing 1007 from a portion adjacent to the light discharge hole 1003 of the outer circumferential surface of the rotary housing 1005, and the striking part 1103 is provided, for example, as a steel bar.

The striking part 1103 strikes the light generating part 1105 to generate light (flame) when the rotary housing 1005 rotates (that is, when the rotary housing 1005 rotates as the pet moves in the exercise space part 1001 inside the rotary housing 1005).

Of course, the flint of the light generating part 1105 and the steel bar of the striking part 1103 which are described above may also be formed vice versa.

As such, when the rotary housing 1005 rotates, light (flame) is generated by the collision of the light generating part 1105 and the striking part 1103, and this light is transmitted into the rotary housing 1005 through the light discharge hole 1003, so that the pet continuously moves and may exercise.

Figure 12:
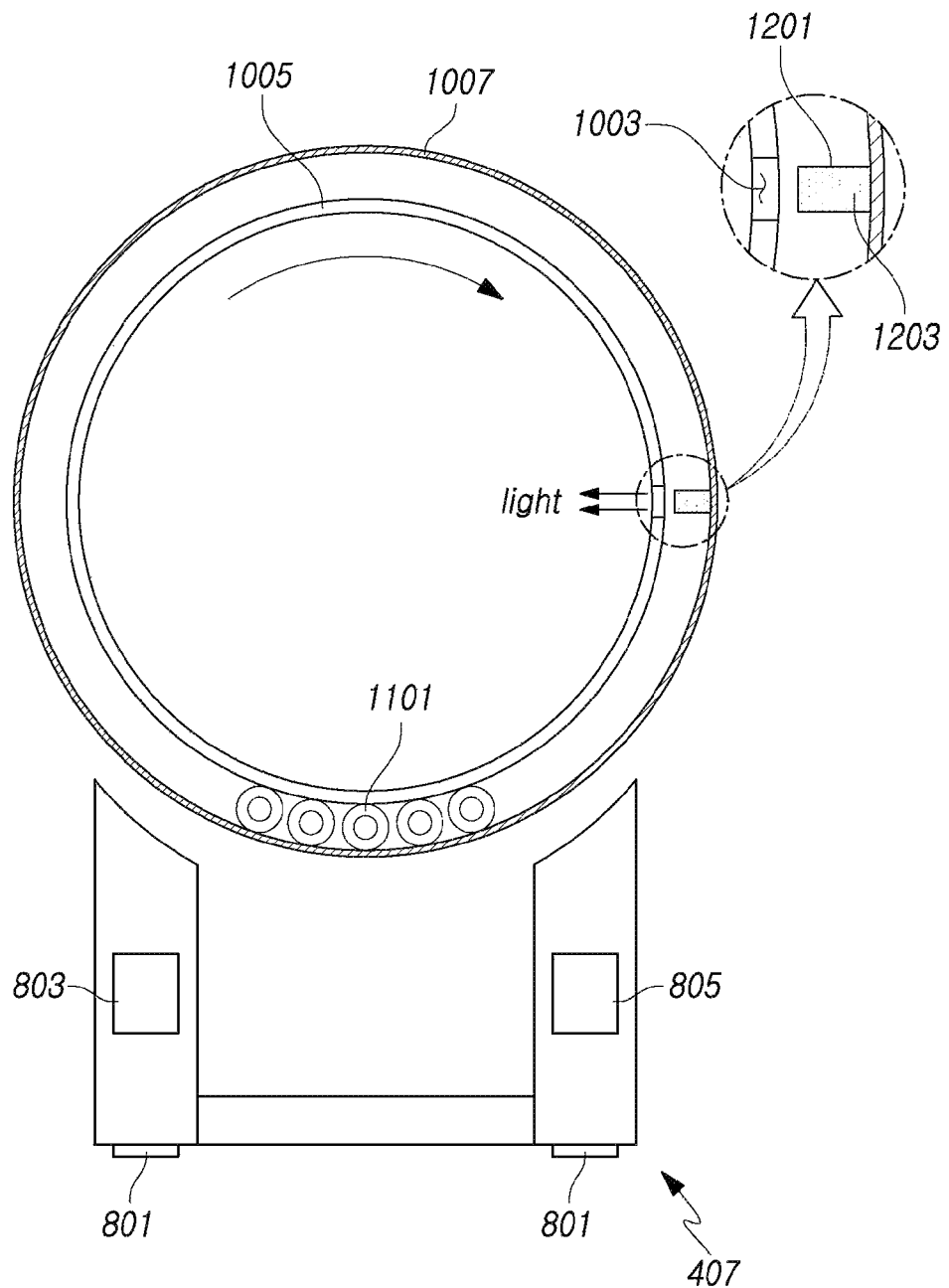

Meanwhile, referring to FIG. 12, the light emitting module 1200 includes a case part 1201 protruding transparently or translucently from the inner circumferential surface of the support housing 1007; and a light emitting medium part 1203 filled in the case part 1201 to generate light.

The case part 1201 is formed to be transparent or translucent, and the case part 1201 protrudes from the inner circumferential surface of the support housing 1007.

The light emitting medium part 1203 is filled in the case part 1201 to generate the light, and the light emitting medium part 1203 may include, for example, light emitting plankton, water particles, or charged particles and gas.

Here, the light emitting plankton is a noctiluca that emits light by itself due to an impact, in the case of the water particles, the light is generated by a principle of generating rainbow (a principle of generating rainbow by scattering light (visual light) applied from the outside by water particles), and in the case of the charged particles and gas, the light is generated by a principle of generating aurora (a principle of converting energy into light while electrically charged plasma particles collide with molecules of gas).

As such, the light emitting medium part 1203 is filled in the transparent or translucent case part 1201, and the light generated in the light emitting medium part 1203 is transmitted into the rotary housing 1005 through the light discharge hole 1003, so that the pet continuously moves and may exercise.

Figure 13:
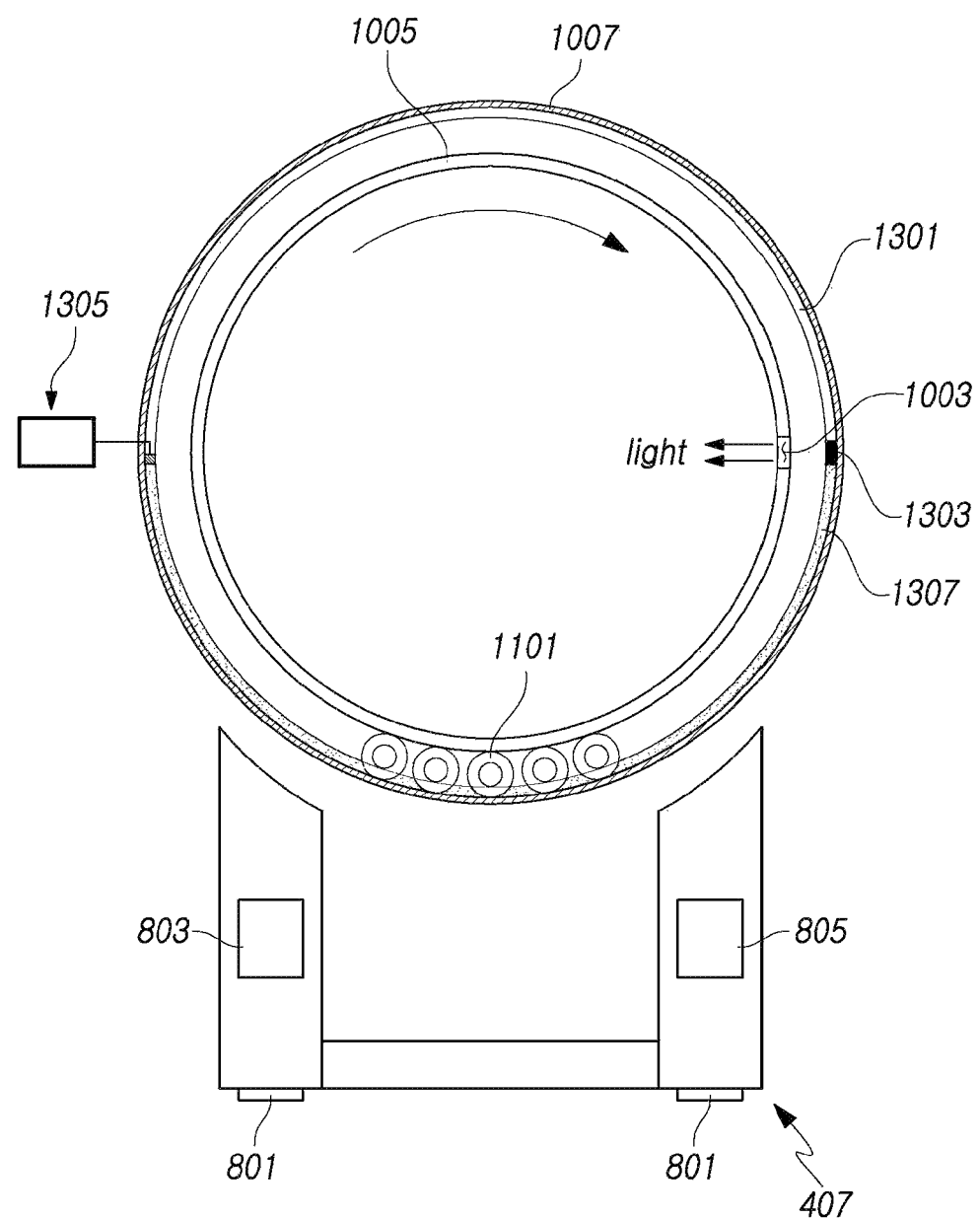

Meanwhile, referring to FIG. 13, the light emitting module 1300 includes a tube 1301 which is provided between the rotary housing 1005 and the support housing 1007 and into which a liquid 1307 is injected; a luminescent floating body 1303 floating on one surface of the liquid 1307 in the tube 1301 and generates light; and a pressure adjusting part 1305 applying pressure to the other surface of the liquid 1307 so that a position of the liquid 1307 in the tube 1301 is varied to adjust a position of the luminescent floating body 1303.

The tube 1301 is provided between the rotary housing 1005 and the support housing 1007, and for example, the tube 1301 is provided in a transparent or translucent ring shape.

The liquid 1307 is injected into the tube 1301, wherein the liquid 1307 is, for example, water.

Of course, as illustrated in FIG. 13, the liquid 1307 is injected into the tube 1301 by a half of the volume or less.

The luminescent floating body 1303 floats on one surface of the liquid 1307 in the tube 1301, and for example, the luminescent floating body 1303 may be a luminous paint, a luminescent paint, or the like that is not mixed with the liquid 1307 (i.e., having a smaller specific gravity than the liquid 1307), and may also be a buoy coated with a luminous paint, a luminescent paint, or the like.

The pressure adjusting part 1305 applies pressure to the other surface of the liquid 1307 so that the position of the liquid 1307 is changed in the tube 1301, thereby adjusting the position of the luminescent floating body 1303. For example, the pressure adjusting part 1305 is slidably moved in the tube 1301 and may be configured to include a pressing plate that presses the other surface of the liquid 1307 and a cylinder that provides a pressure driving force to the pressing plate.

In addition, when the pressure adjusting part 1305 presses the other surface of the liquid 1307, the liquid 1307 moves counterclockwise along the tube 1301 based on FIG. 13, and as a result, the luminescent floating body 1303 floating on one surface of the liquid 1307 also moves counterclockwise along the tube 1301, so that the user controls the operation of the pressure adjusting part 1305, thereby adjusting the position of the light transmitted into the rotary housing 1005 through the light discharge hole 1003.

Due to the configuration of the light emitting module 1300, the pet continuously moves by tracking the light transmitted into the rotary housing 1005 through the light discharge hole 1003 and may exercise.

Figure 14:
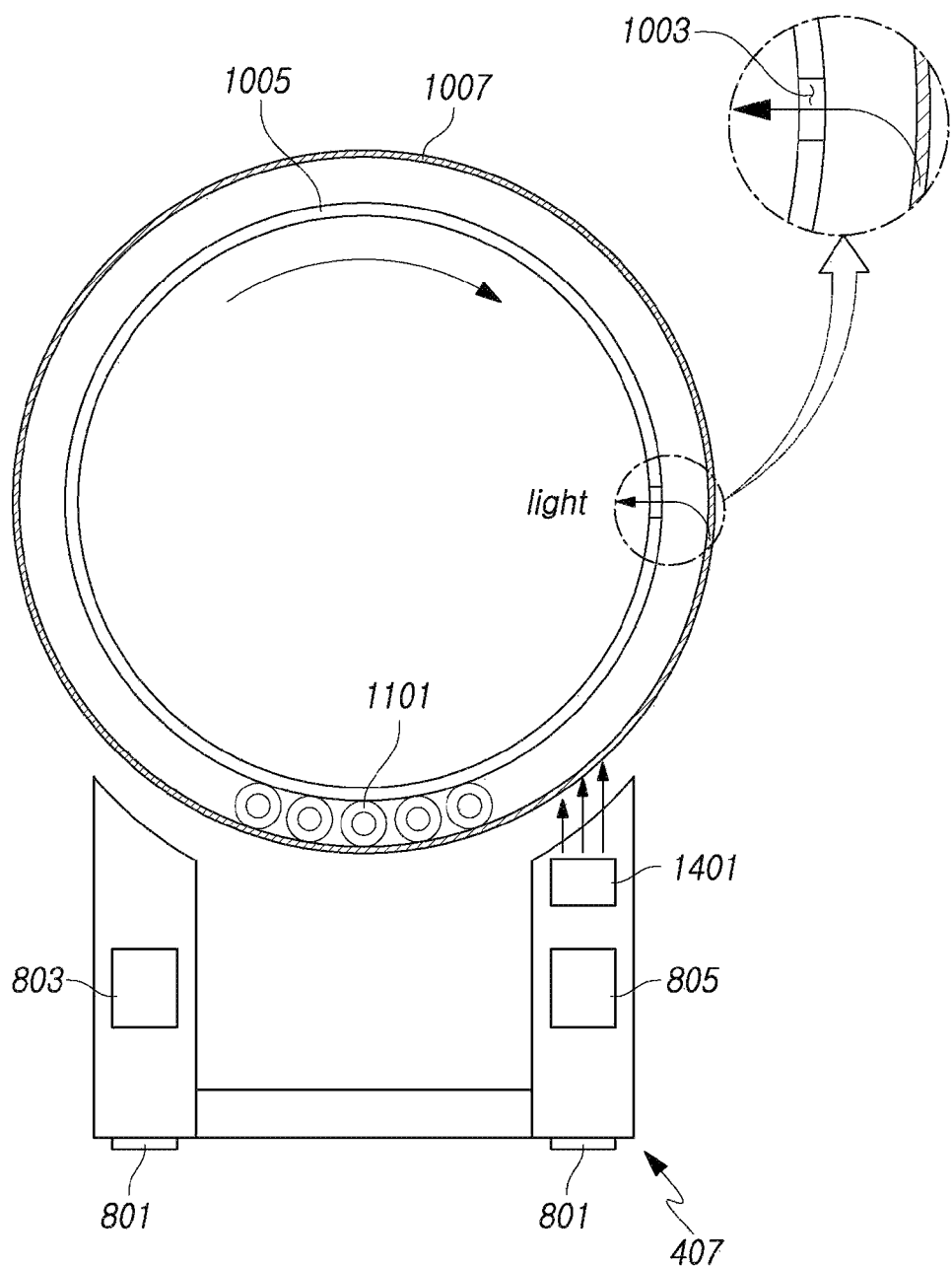

Meanwhile, referring to FIG. 14, the light emitting module includes a light source part 1401 transmitting the light toward the support housing 1007 from the outside of the support housing 1007, the support housing 1007 is formed of an axial light plate, and the light transmitted from the light source part 1401 passes through the support housing 1007 to be transmitted into the rotary housing 1005 through the light discharge hole 1003.

Here, the light source part 1401 may be provided in the support module 407, and the light transmitted from the light source part 1401 passes through the support housing 1007 formed of the axial light plate to be transmitted into the rotary housing 1005 through the light discharge hole 1003.

Due to such a configuration of the light emitting module, the pet continuously moves by tracking the light transmitted into the rotary housing 1005 through the light discharge hole 1003 and may exercise.

Figure 15:
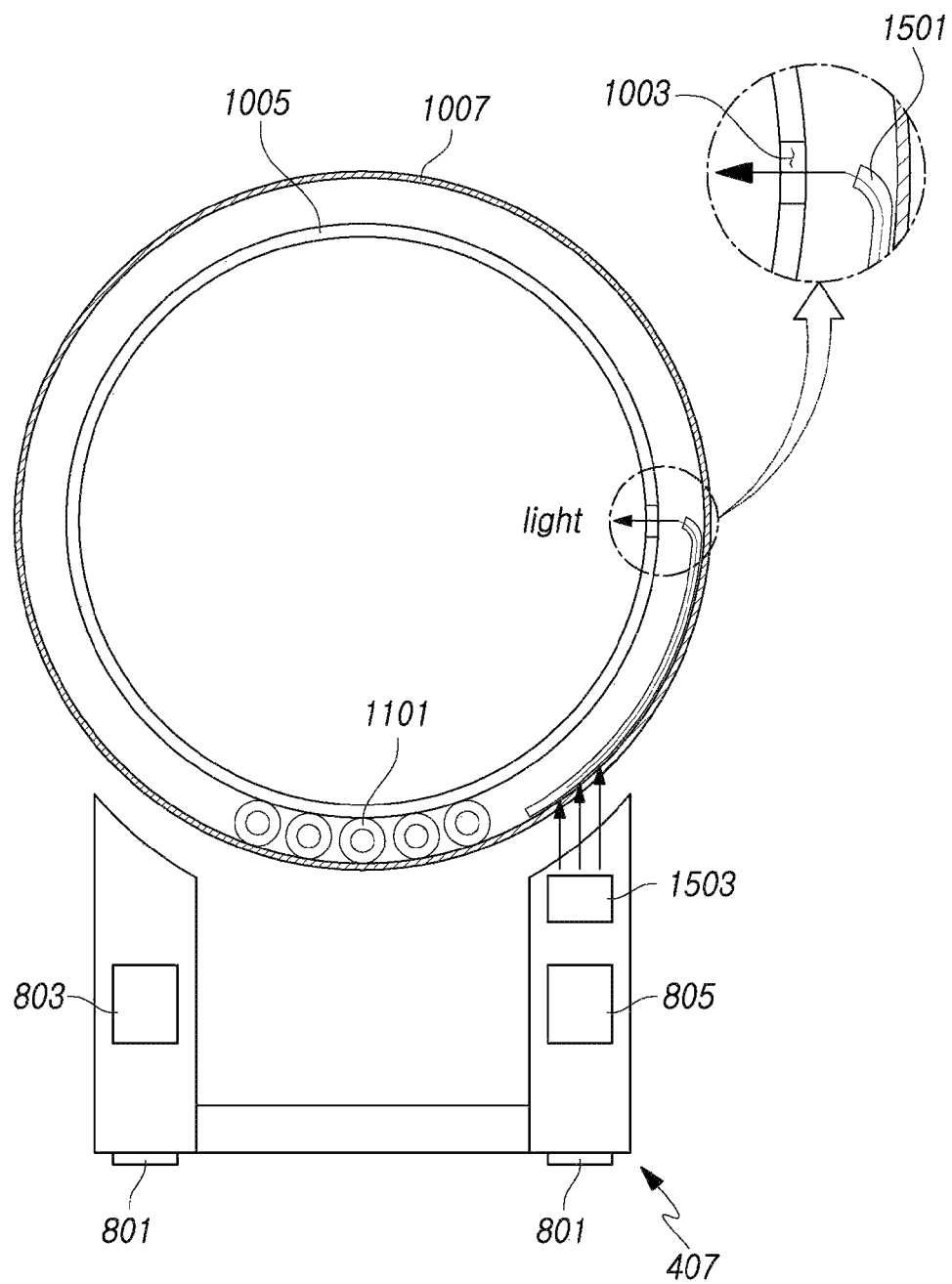
Figure 16:
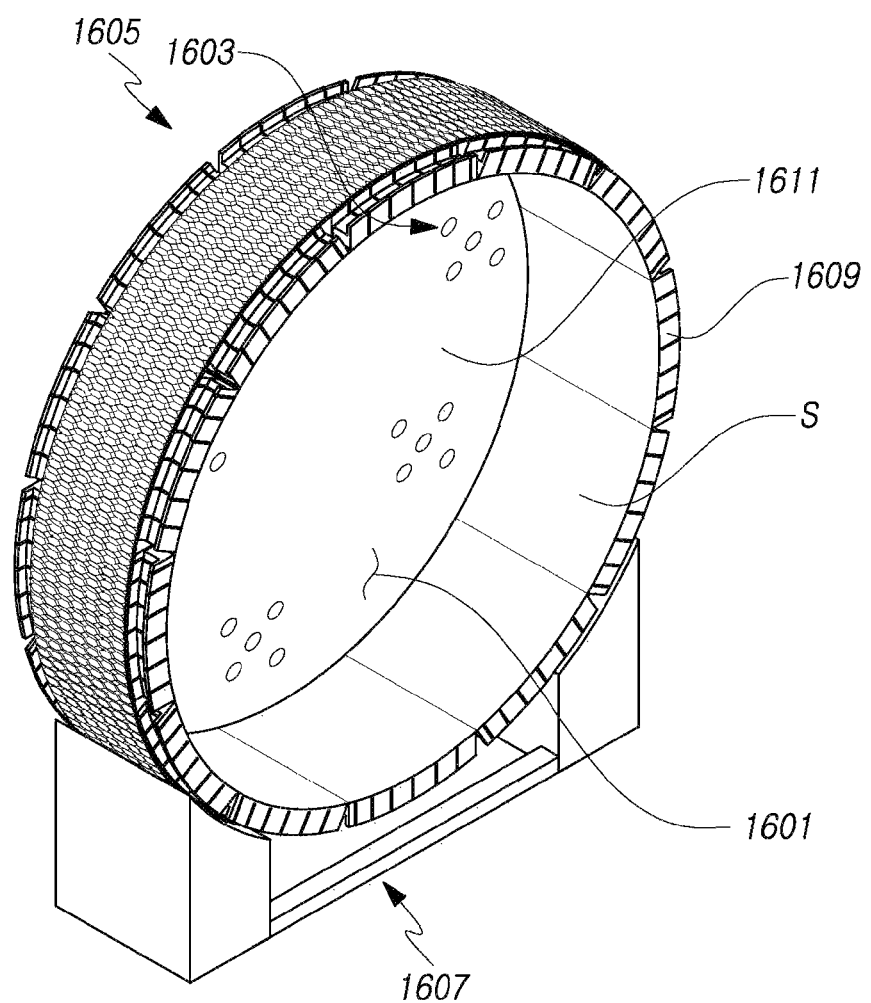
FIG. 16 is a perspective view of a pet exercise apparatus according to an embodiment of the present invention.
Figure 17:
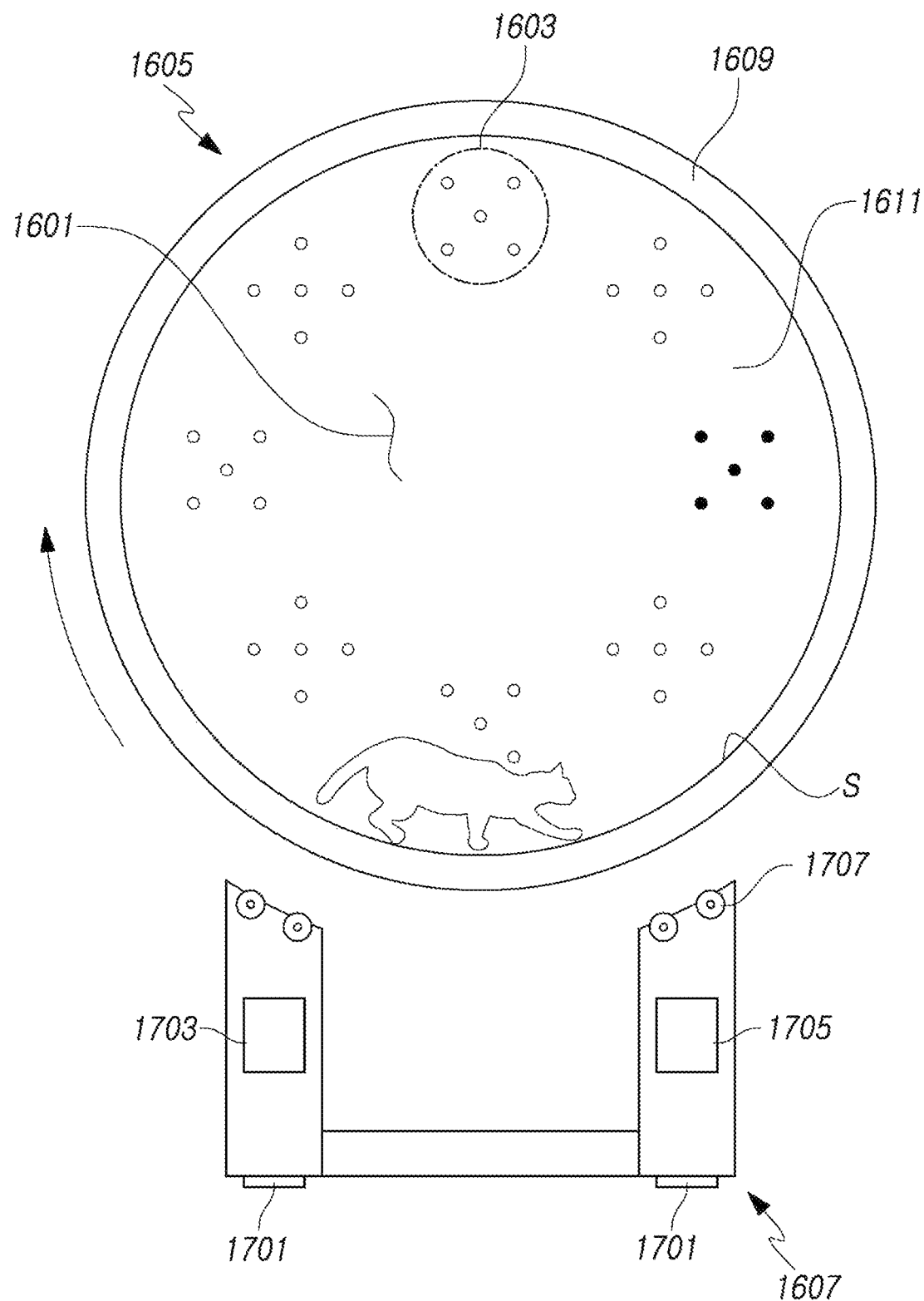
FIG. 17 is a view schematically illustrating the pet exercise apparatus of FIG. 16.
Figure 18:
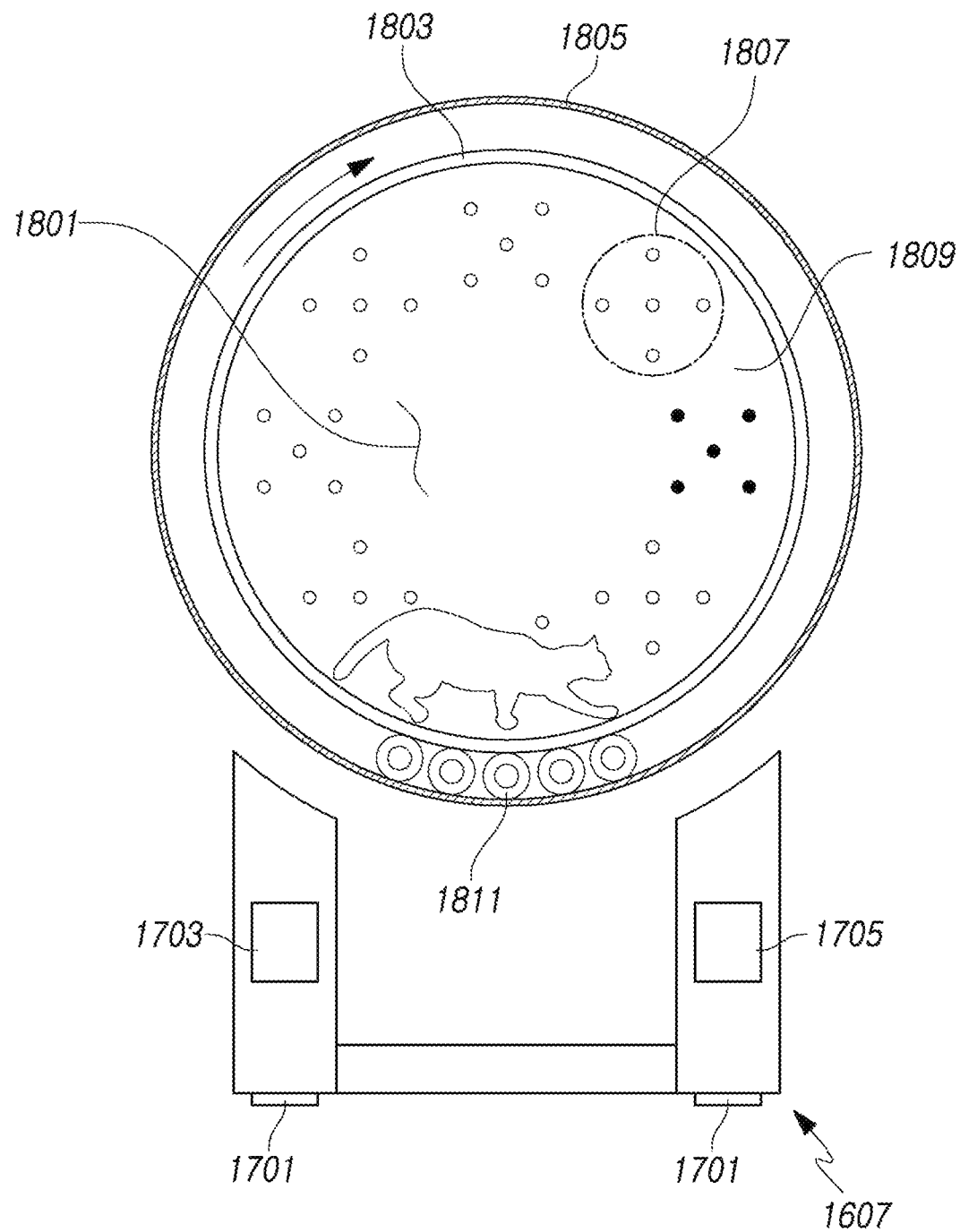
FIG. 18 is a view schematically illustrating a pet exercise apparatus according to another embodiment of the present invention.
Figure 19:
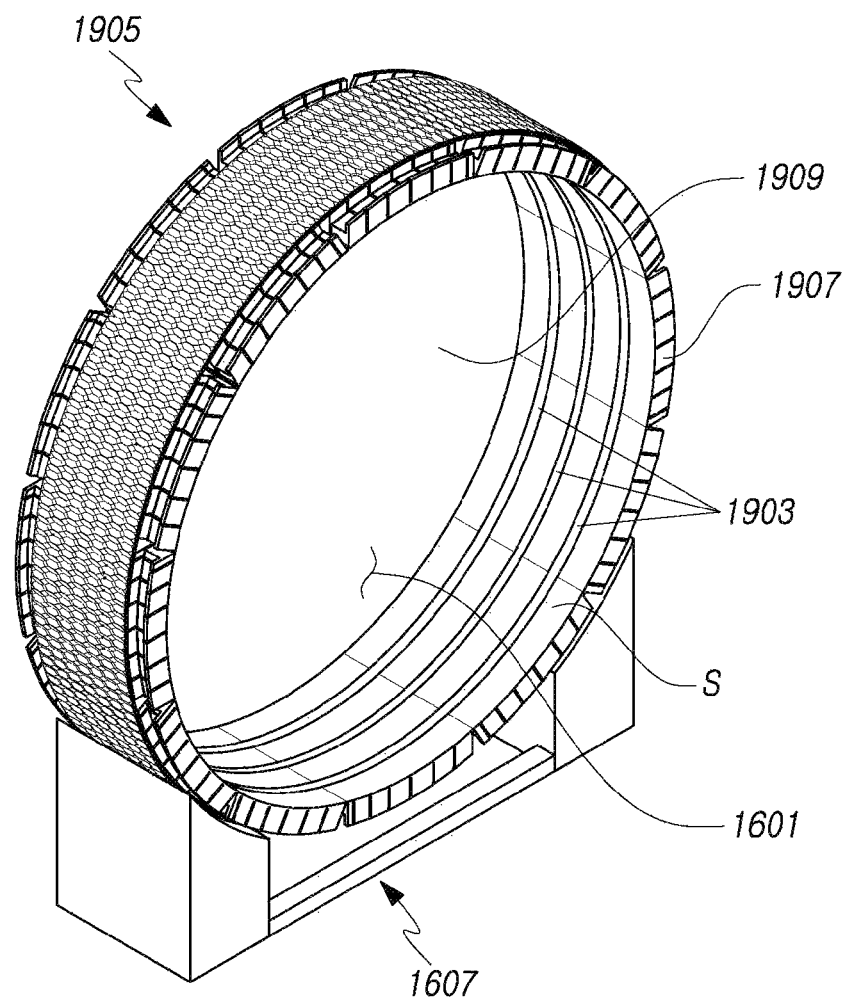
FIG. 19 is a perspective view of a pet exercise apparatus according to yet another embodiment of the present invention.

Meanwhile, referring to FIG. 15, the light emitting module 1500 includes an optical fiber line part 1501 provided between the rotary housing 1005 and the support housing 1007; and a light source part 1503 that transmits light toward the optical fiber line part 1501. The light transmitted from the light source part 1503 passes through the optical fiber line part 1501 to be transmitted into the rotary housing 1005 through the light discharge hole 1003.

The optical fiber line part 1501 is provided between the rotary housing 1005 and the support housing 1007, and the optical fiber line part 1501 consists of optical fibers that allow light passing through central glass to be totally reflected using a glass having a high refractive index in a central portion and a glass having a low refractive index in an outer portion.

The light source part 1503 transmits light toward the optical fiber line part 1501 and the light source part 1503 may be provided, for example, in the support module 407.

Of course, the support housing 1007 is formed of a transparent or translucent material in a specific area or an entire area so that the light transmitted from the light source part 1503 reaches the optical fiber line part 1501.

Due to such a configuration of the light emitting module 1500, the pet continuously moves by tracking the light transmitted into the rotary housing 1005 through the light discharge hole 1003 and may exercise.

As described above, according to an embodiment of the present invention, by inducing the gaze or attracting an interest of the pet, there is an effect that the pet exercise apparatus allows the pet to continuously exercise in a narrow indoor space for a long time.

Meanwhile, as illustrated in FIGS. 16 to 22, a pet exercise apparatus according to an embodiment of the present invention includes running modules 1605 and 1905 including a pet exercise space part 1601 formed therein and gaze inducing parts 1603 and 1903 provided on an inner circumferential surface thereof and inducing a pet's gaze; and a support module 1607 supporting the running modules 1605 and 1905 so that the running modules 1605 and 1905 are rotatable according to a motion of the pet.

The running modules 1605 and 1905 include the pet exercise space part 1601 formed therein.

As an example, the running modules 1605 and 1905 are formed in an overall ring shape, and an inner space thereof is provided with the pet exercise space part 1601.

More specifically, a pet such as cat may exercise through a motion such as running or walking along inner circumferential surfaces S of the running modules 1605 and 1905 in the exercise space part 1601, which is the inner space of the running modules 1605 and 1905.

The running modules 1605 and 1905 include the gaze inducing parts 1603 and 1903 that induce the pet's gaze, and the gaze inducing parts 1603 and 1903 are provided on the inner circumferential surfaces of the running modules 1605 and 1905.

Here, when an example of the running module 1605 will be described in detail, the running module 1605 includes a main body part 1609 formed with the exercise space part 1601 therein and formed in a curved surface; and a display part 1611 which blocks one side of the main body part 1609 and is provided with the gaze inducing part 1603.

The main body part 1609 is provided in a ring shape formed in a curved surface as an example, and the exercise space part 1601 in which the pet may run or walk is formed inside the main body part 1609.

That is, the pet may exercise while running or walking along the inner circumferential surface S of the main body part 1609.

The display part 1611 is formed to be coupled to the main body part 1609 or integrally with the main body part 1609 so as to block one side of the main body part 1609, wherein the display part 1611 is provided with the gaze inducing part 1603.

As an example, the display part 1611 may be provided as a display panel.

Of course, the display part 1611 may also be provided as a flat plate.

Meanwhile, the gaze inducing part 1603 includes, for example, a light emitting module that emits light at a predetermined position or a variable position of the display part 1611.

More specifically, the light emitting module is a light emitting member that is turned on/off by power to be supplied, and for example, may be provided as an LED.

Meanwhile, the gaze inducing part 1603 (light emitting module) emits light at a predetermined position of the display part 1611 or emits light at a variable position thereof.

In more detail, the gaze inducing part 1603 (light emitting module) may emit light at a predetermined position (e.g., 3-o'clock direction) depending on the rotational speed of the main body part 1609 when the main body part 1609 rotates according to the motion of the pet.

Alternatively, unlike this, the gaze inducing part 1603 may emit the light at a random position depending on the rotational speed of the main body part 1609.

As such, the gaze inducing part 1603 (light emitting module) emits the light at the predetermined position or the variable position of the display part 1611, so that the pet continuously moves by targeting the gaze inducing part 1603 (light emitting module) and may exercise.

Of course, a control module 2101 is provided in the pet exercise apparatus to control an operation (turning-on/off operation) of the gaze inducing part 1603 (light emitting module) according to the rotational speed of the running module 1605 (more specifically, the main body part 1609), so that the gaze inducing part 1603 (light emitting module) is turned on or off depending on the rotational speed of the running module 1605 (more specifically, the main body part 1609).

Figure 21:
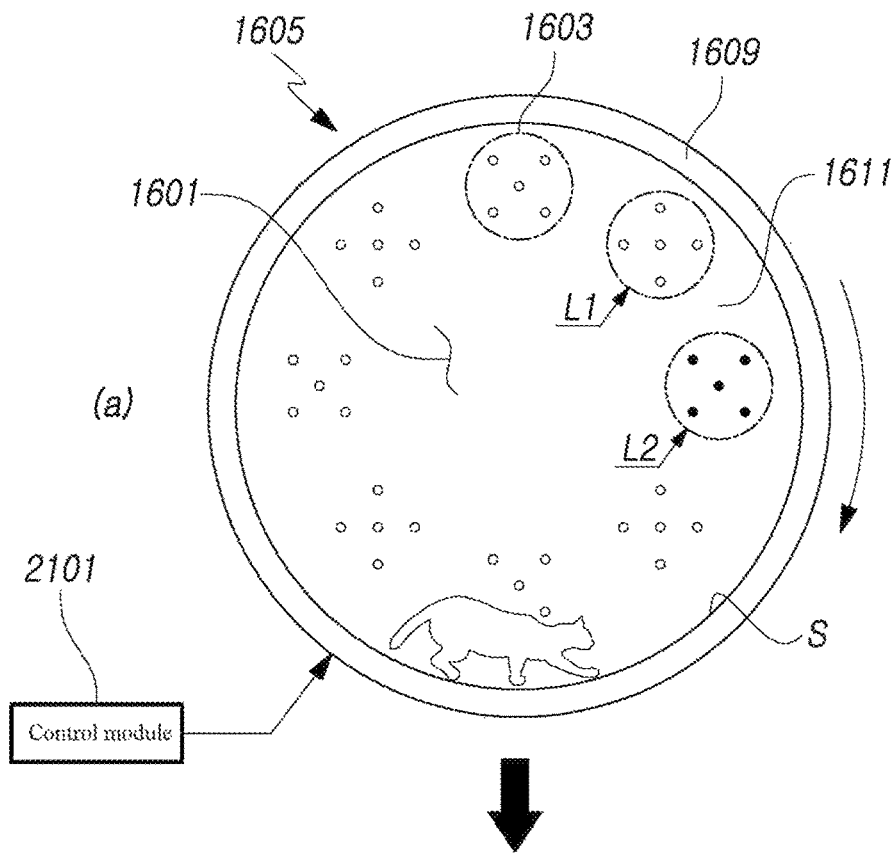
FIG. 21 is a view for describing an operation example of a gaze inducing part in the pet exercise apparatus of FIG. 17.
Figure 21:
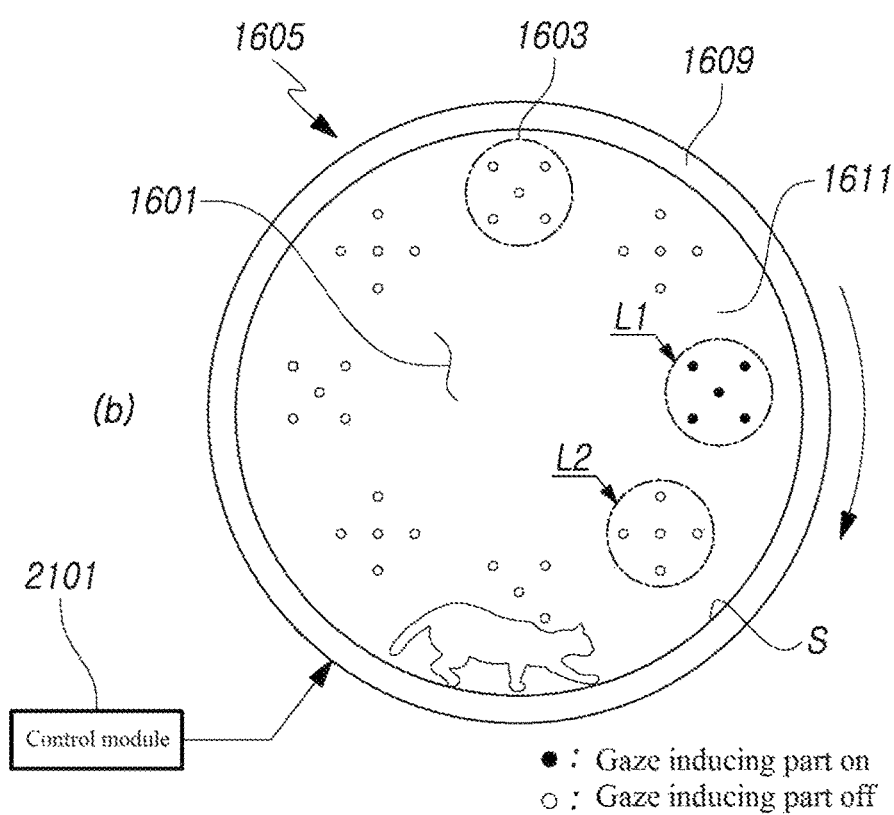

As an example, when the pet starts to move in the exercise space part 1601, the control module 1201 controls the gaze inducing part 1603, L2 to be turned on and the gaze inducing part 1603, L1 to be turned off (see FIG. 21A), and when the running module 1605 (more specifically, the main body part 1609) rotates in one direction (clockwise in FIG. 21) while the pet moves, the control module 1201 controls the gaze inducing part 1603, L1 to be turned on and the gaze inducing part 1603, L2 to be turned off according to the rotational speed of the running module 1605 (more specifically, the main body part 1609) (see FIG. 21B).

Although not illustrated in the drawings, the rotational speed of the running module 1605 (more specifically, the main body part 1609) is sensed by a rotational speed measurement sensing part and information on the sensed rotational speed is transmitted to the control module 2101.

Meanwhile, when another example of the running module 1905 will be described, the running module 1905 includes a main body part 1907 formed with the exercise space part 1601 therein, formed in a curved surface, and provided with a gaze inducing part 1903 on an inner circumference surface; and a plate part 1909 blocking one side of the main body part 1907.

The main body part 1907 is provided in a ring shape formed in a curved surface as an example, and the exercise space part 1601 in which the pet may run or walk is formed inside the main body part 1907.

That is, the pet may exercise while running or walking along the inner circumferential surface S of the main body part 1907.

On the inner circumferential surface S of the main body part 1907, the gaze inducing part 1903 is provided.

Here, the gaze inducing part 1903 includes a light emitting module that emits light at a predetermined position or a variable position of the inner circumferential surface S of the main body part 1907.

More specifically, the light emitting module is a light emitting member that is turned on/off by power to be supplied, and for example, may be provided as an LED.

In the drawings, an example is illustrated, in which the gaze inducing part 1903 (light emitting module) is formed by three lines (a plurality of LEDs are mounted in each line) on the inner circumferential surface S of the main body part 1907.

The gaze inducing part 1903 (light emitting module) emits light at a predetermined position of the inner circumferential surface S of the main body part 1907 or emits light at a variable position thereof.

Figure 20:
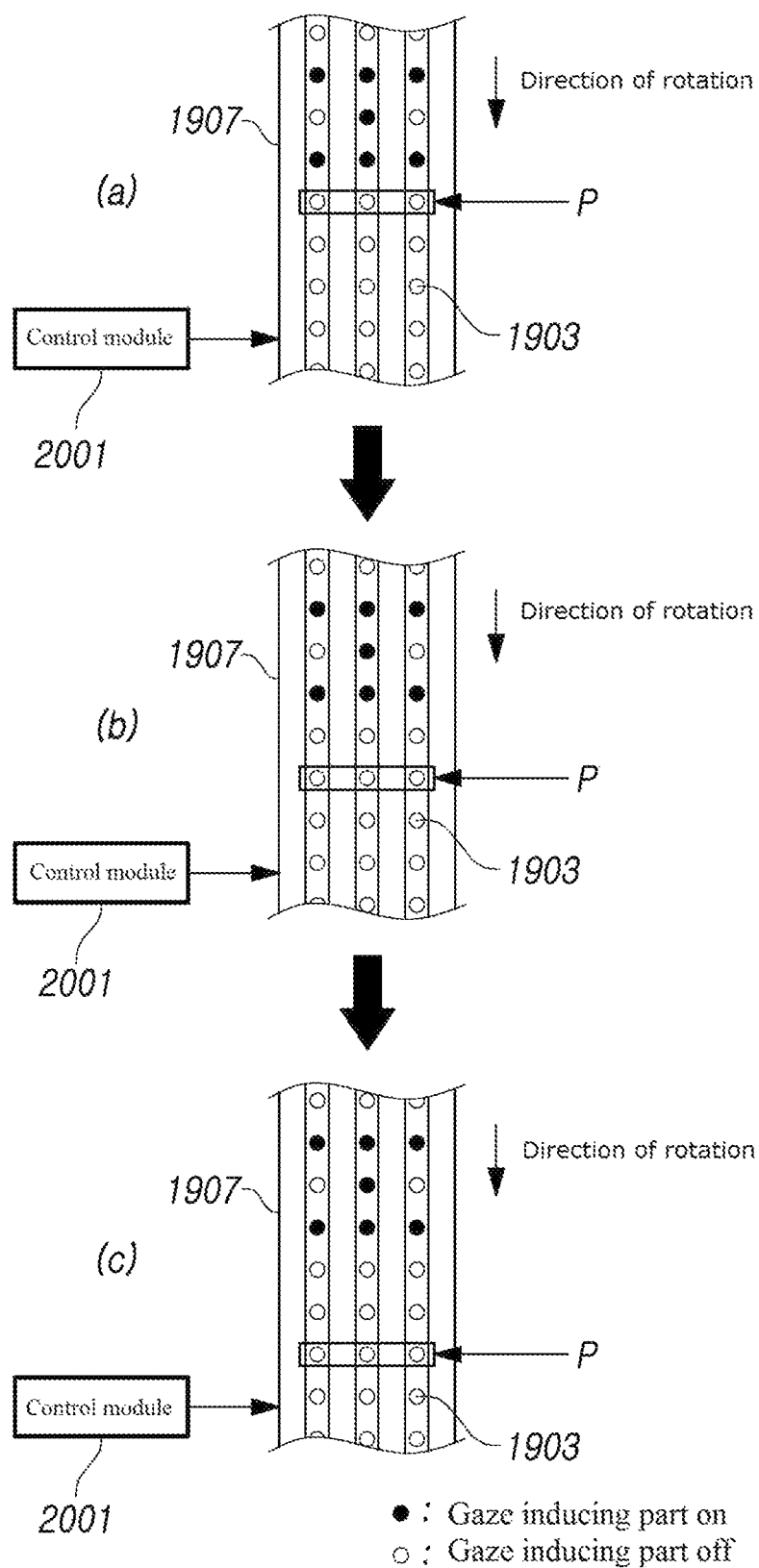
FIG. 20 is a view for describing an operation example of a gaze inducing part in FIG. 19.

In more detail, the gaze inducing part 1903 (light emitting module) may emit light at a predetermined position (e.g., a 3-o'clock direction) depending on the rotational speed of the main body part 1907 when the main body part 1907 rotates as the pet moves (FIG. 20 illustrates that despite the rotation (the position of the gaze inducing part 1903 (light emitting module) indicated by P is changed) of the main body part 1907, the gaze inducing part 1903 (the LED as the light emitting module) emits light at a predetermined position so as to indicate a 'Z' shape).

Of course, unlike those described above, the gaze inducing part 1903 (light emitting module) may also emit the light at a random position depending on the rotational speed of the main body part 1907.

As such, the gaze inducing part 1903 (light emitting module) emits the light at the predetermined position or the variable position of the main body part 1907, so that the pet continuously moves by targeting the gaze inducing part 1903 (light emitting module) and may exercise.

Of course, similarly to those described above, a control module 2001 is provided in the pet exercise apparatus to control an operation (turning-on/off operation) of the gaze inducing part 1903 (light emitting module) according to the rotational speed of the running module 1905 (more specifically, the main body part 1907), so that the gaze inducing part 1903 (light emitting module) is turned on or off depending on the rotational speed of the running module 1905 (more specifically, the main body part 1907).

Although not illustrated in the drawings, the rotational speed of the running module 1905 (more specifically, the main body part 1907) is sensed by a rotational speed measurement sensing part and information on the sensed rotational speed is transmitted to the control module 2001.

Subsequently, the plate part 1909 is formed to be coupled to or integrally with the main body part 1907 to block one side of the main body part 1907.

Although not illustrated in the drawings, the plate part 1909 may be provided with the gaze inducing part (light emitting module) inducing the pet's gaze.

Subsequently, the support module 1607 supports the running modules 1605 and 1905 such that the running modules 1605 and 1905 are rotatable according to the motion of the pet.

Such a support module 1607 includes a weight measuring part 1701, and the weight measuring part 1701 is provided to measure the weight of the pet exercising in the running modules 1605 and 1905.

Here, the weight measuring part 1701 is provided as, for example, a load cell.

In addition, the support module 1607 includes a speaker part 1703, and favorite music, sound, and the like of the pet may be transmitted, or a pet owner's voice may be transmitted by the speaker part 1703.

In addition, the support module 1607 includes a communication part 1705, and by the communication part 1705, a control signal transmitted from an external terminal is transmitted to the pet exercise apparatus, and information about the rotational speed of the running modules 1605 and 1905, the pet's weight measured by the weight measuring part 1701, and the like is transmitted to the external terminal.

Of course, the support module 1607 includes the control modules 2001 and 2101 described above, and a control module 2201 to be described below.

In addition, the support module 1607 includes a roller 1707 that supports the rotational motion of the running modules 1605 and 1905, that is, the roller 1707 supports the running modules 1605 and 1905 (more specifically, the main body parts 1609 and 1907) to rotate in place.

Meanwhile, a pet exercise apparatus according to another embodiment of the present invention includes a rotary housing 1803 having a pet exercise space part 1801 formed therein and formed in a curved surface; a support housing 1805 covering an outside of the rotary housing 1803; a display part 1809 blocking one sides of the rotary housing 1803 and the support housing 1805 and provided with a gaze inducing part 1807 inducing a pet's gaze; and a rotary support member 1811 provided between the rotary housing 1803 and the support housing 1805 and supporting the rotational motion of the rotary housing 1803.

The rotary housing 1803 includes the pet exercise space part 1801 formed therein.

As an example, the rotary housing 1803 is formed in an overall ring shape, and an inner space thereof is provided with the pet exercise space part 1801.

More specifically, a pet such as cat may exercise through a motion such as running or walking along an inner circumferential surface of the rotary housing 1803 in the exercise space part 1801, which is the inner space of the rotary housing 1803.

Subsequently, the support housing 1805 covers the outside of the rotary housing 1803.

The support housing 1805 is formed, for example, in an overall ring shape.

The support housing 1805 is supported by the support module 1607.

Subsequently, the display part 1809 blocks one sides of the rotary housing 1803 and the support housing 1805.

The display part 1809 may be coupled to the support housing 1805 or may be integrally with the support housing 1805.

As an example, the display part 1809 may be provided as a display panel.

Of course, the display part 1809 may also be provided as a flat plate.

The display part 1809 is provided with the gaze inducing part 1807 inducing the pet's gaze.

Here, the gaze inducing part 1807 includes, for example, a light emitting module that emits light at a predetermined position or a variable position of the display part 1809.

More specifically, the light emitting module is a light emitting member that is turned on/off by power to be supplied, and for example, may be provided as an LED.

Meanwhile, the gaze inducing part 1807 (light emitting module) emits light at a predetermined position of the display part 1809 or emits light at a variable position thereof.

In more detail, the gaze inducing part 1807 (light emitting module) may emit light at a predetermined position (e.g., 3-o'clock direction) depending on the rotational speed of the rotary housing 1803 when the rotary housing 1803 rotates according to the motion of the pet.

Alternatively, unlike this, the gaze inducing part 1803 may also emit the light at a random position depending on the rotational speed of the rotary housing 1803.

As such, the gaze inducing part 1807 (light emitting module) emits the light at the predetermined position or the variable position of the display part 1809, so that the pet continuously moves by targeting the gaze inducing part 1807 (light emitting module) and may exercise.

Of course, a control module 2201 is provided in the pet exercise apparatus to control an operation (turning-on/off operation) of the gaze inducing part 1807 (light emitting module) according to the rotational speed of the rotary housing 1803, so that the gaze inducing part 1807 (light emitting module) is turned on or off depending on the rotational speed of the rotary housing 1803.

Figure 22:
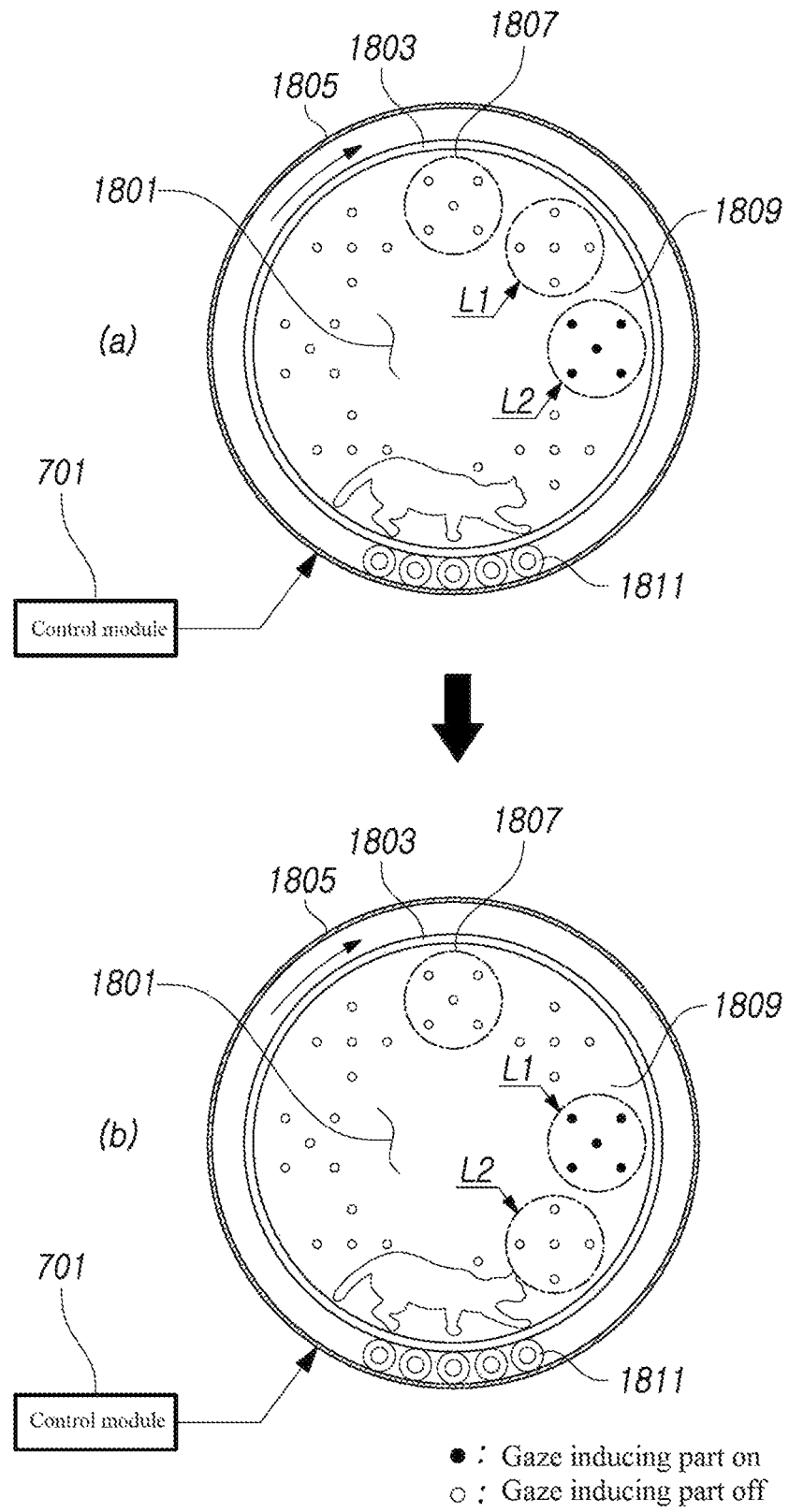
FIG. 22 is a view for describing an operation example of a gaze inducing part in the pet exercise apparatus of FIG. 18.
Figure 23:
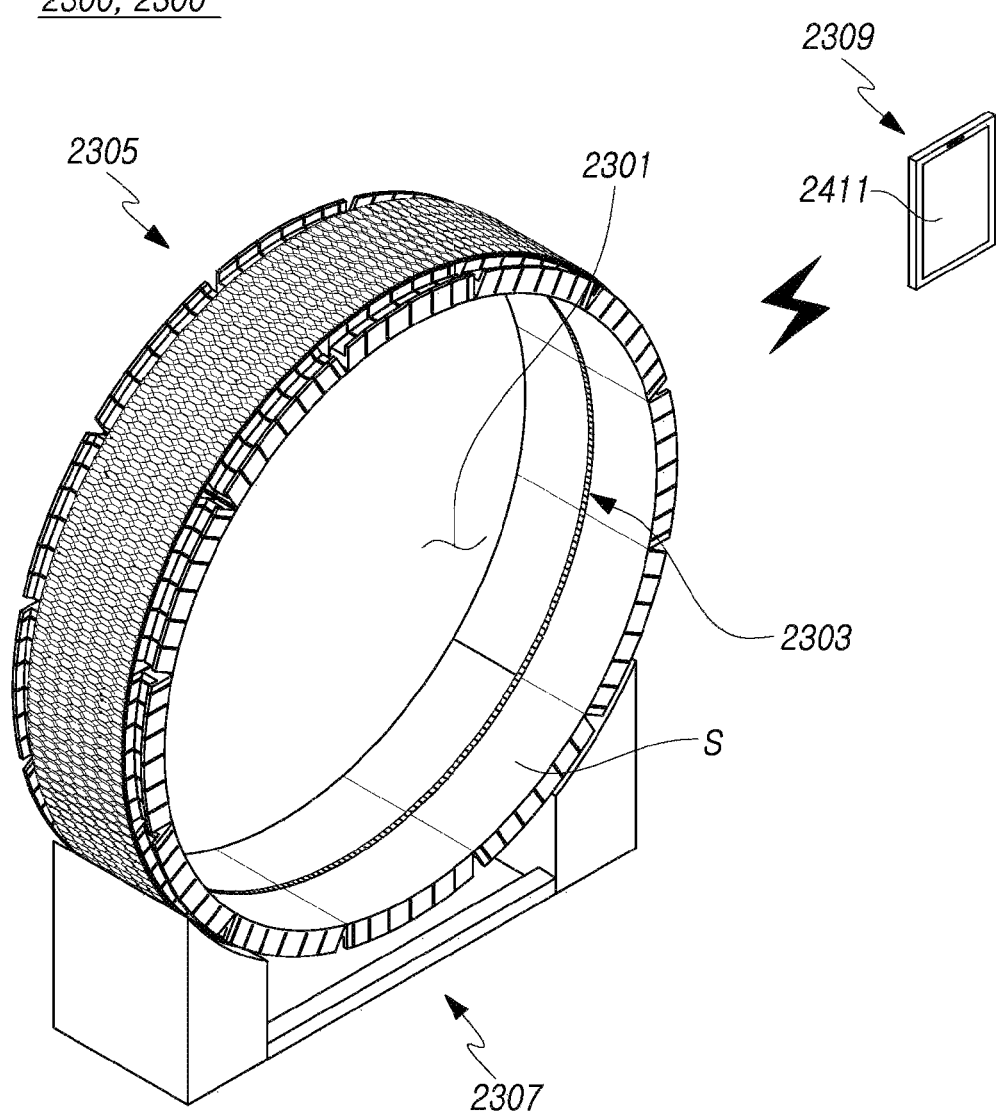
FIG. 23 is a view illustrating a pet exercise system according to an embodiment of the present invention.

As an example, when the pet starts to move in the exercise space part 1801, the control module 2201 controls the gaze inducing part 1807, L2 to be turned on and the gaze inducing part 1807, L1 to be turned off (see FIG. 22A), and when the rotary housing 1803 rotates in one direction (clockwise in FIG. 22) while the pet moves, the control module 2201 controls the gaze inducing part 1807, L1 to be turned on and the gaze inducing part 1807, L2 to be turned off according to the rotational speed of the rotary housing 1803 (see FIG. 22B).

Although not illustrated in the drawings, the rotational speed of the rotary housing 1803 is sensed by a rotational speed measurement sensing part and information on the sensed rotational speed is transmitted to the control module 2201.

Subsequently, the rotary support member 1811 is provided between the rotary housing 1803 and the support housing 1805, and the rotary support member 1811 supports the rotational motion of the rotation housing 1803.

The rotating support member 1811 is formed, for example, by coupling rollers on both sides of the central axis.

As described above, according to an embodiment of the present invention, by inducing the gaze or attracting an interest of the pet, there is an effect that the pet exercise apparatus allows the pet to continuously exercise in a narrow indoor space for a long time.

Meanwhile, as illustrated in FIGS. 23 to 30, a pet exercise system 2300 according to an embodiment of the present invention is characterized by including a rotary module 2305 which has an exercise space part 2301 formed therein as a space in which the pet may exercise, and a gaze inducing part 2303 provided on an inner circumferential surface and inducing a pet's gaze so that the pet continuously moves in the exercise space part 2301 and may exercise; a support module 2307 supporting the rotary module 2305 so that the rotary module 2305 is rotatable according to the motion of the pet; a control module 2401 controlling an operation of the gaze inducing part 2303; and a terminal 2309 including a communication part 2403 transmitting an operation control signal CI of the gaze inducing part 2303 to be transmitted to the control module 2401.

The rotary module 2305 includes the exercise space part 2301 formed therein as a space in which the pet may move.

As an example, the rotary module 2305 is formed in an overall ring shape, and an inner space thereof is provided with the pet exercise space part 2301.

More specifically, a pet such as cat may exercise through a motion such as running or walking along an inner circumferential surface S of the rotary module 2305 in the exercise space part 2301, which is the inner space of the rotary module 2305.

The rotary module 2305 includes a gaze inducing part 2303 that induces a pet's gaze so that the pet continuously moves in the exercise space part 2301 and may exercise.

Here, the gaze inducing part 2303 is provided on the inner circumferential surface S of the rotary module 2305.

Of course, if the rotary module 2305 has a one side-closed shape (a structure in which one side is closed by a side wall), not a ring shape (a structure of which both sides are opened) illustrated in the drawings, the gaze inducing part 2303 may also be provided on a side wall which is the inner circumferential surface of the rotary module 2305.

Hereinafter, various modified embodiments of the gaze inducing part 2303 will be described.

First, the gaze inducing part 2303 includes light emitting modules 2501 and 2701 that emit light at a predetermined position or variable position on the inner circumferential surface of the rotary module 2305, regardless of the rotational motion of the rotary module 2305.

Here, the light emitting module 2501 includes lighting members L1, L2, L3, etc. emitting the light by power.

More specifically, the lighting members L1, L2, L3, etc. are provided as LEDs in which light is emitted by power to be supplied.

Figure 25:
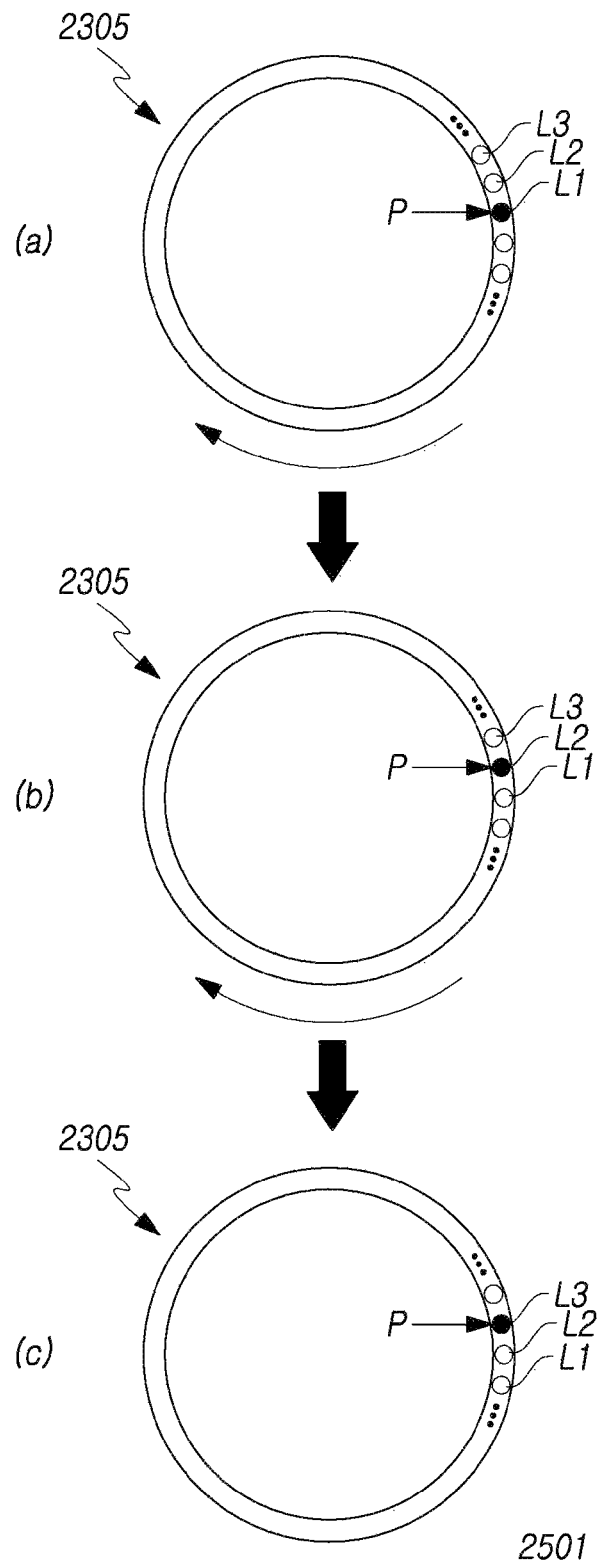
FIGS. 25 and 26 are views illustrating an operation example of a rotary module in the pet exercise system according to the embodiment of the present invention.
Figure 26:
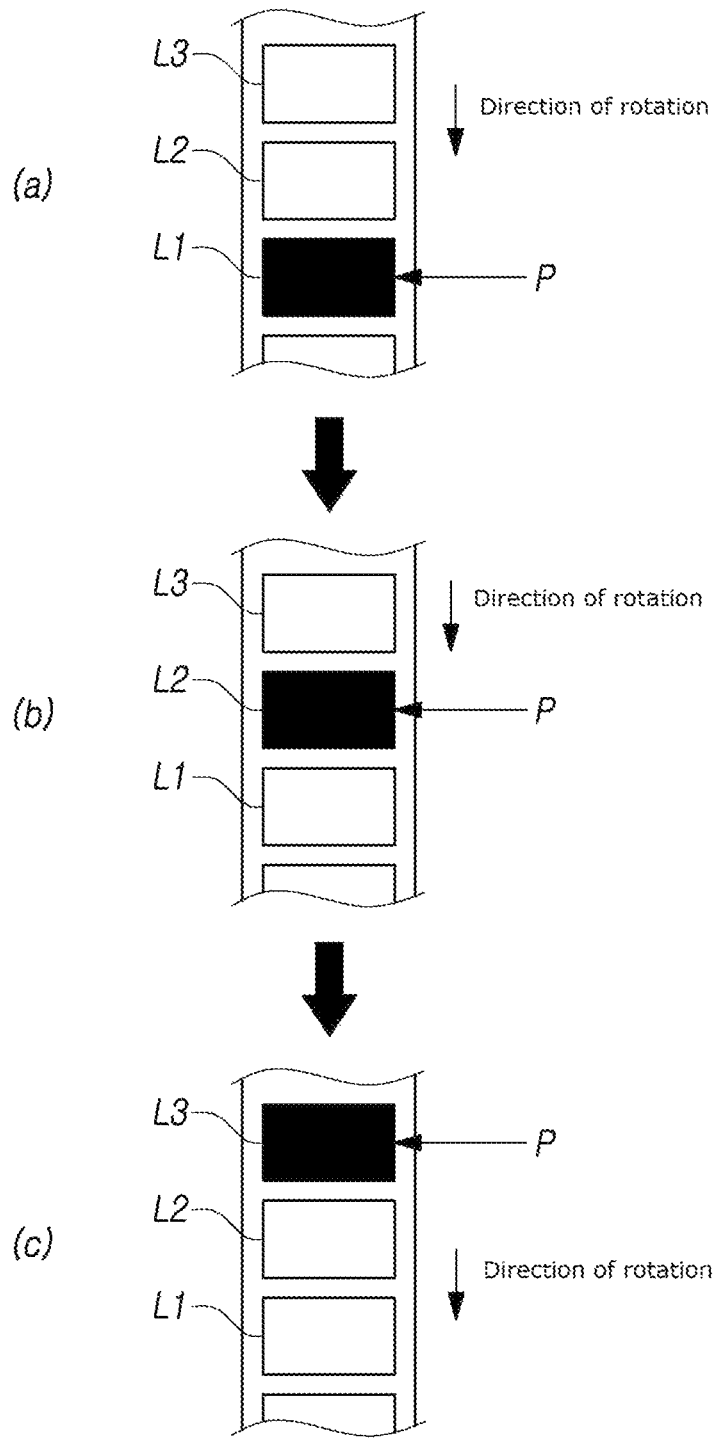

As illustrated in FIGS. 25 and 26, the lighting member L1 is turned on at a predetermined position P on an inner circumferential surface of the rotary module 2305, and after the rotary module 2305 rotates at a predetermined angle clockwise (FIGS. 25 and 26B), the lighting member L1 is turned off and the adjacent lighting member L2 is turned on, and then after the rotary module 2305 rotates at a predetermined angle clockwise again (FIGS. 25 and 26C), the lighting member L2 is turned off and the adjacent lighting member L3 is turned on.

Even if the rotary module 2305 rotates as the pet moves in the rotary module 2305 by the turn-on or turn-off of the lighting members L1, L2, L3, etc., the light is continuously emitted at the predetermined position P on the inner circumferential surface of the rotary module 2305, so that the pet continuously moves by targeting and tracking the light to be emitted and may exercise.

Of course, a control module 2401 is provided to control a turn-on or off operation of the lighting members L1, L2, L3, etc., the gaze inducing part 2303, or the light emitting module 2501 according to the rotational speed of the rotary module 2305, so that the lighting members L1, L2, L3, etc. included in the gaze inducting unit 2303, more specifically the light emitting module 2501, and much more specifically the lighting member L1 are turned on or off depending on the rotational motion (rotational speed) of the rotary module 2305.

Meanwhile, in addition to the above-described content, the predetermined position P of the inner circumferential surface of the rotary module 2305 may also be varied.

That is, according to another embodiment of the present invention, as the position of the lighting member L1, L2, L3, etc. to be turned on is varied, the predetermined position P of the inner circumferential surface of the rotary module 2305 may also be varied.

Meanwhile, unlike those described above, the light emitting module 2701 included in the gaze inducing part 2303 may also include reflective members M1, M2, M3, etc. that reflect incident light to emit the light.

More specifically, the reflective members M1, M2, M3, etc. are provided as mirrors reflecting light incident from the light source 2703.

Figure 27:
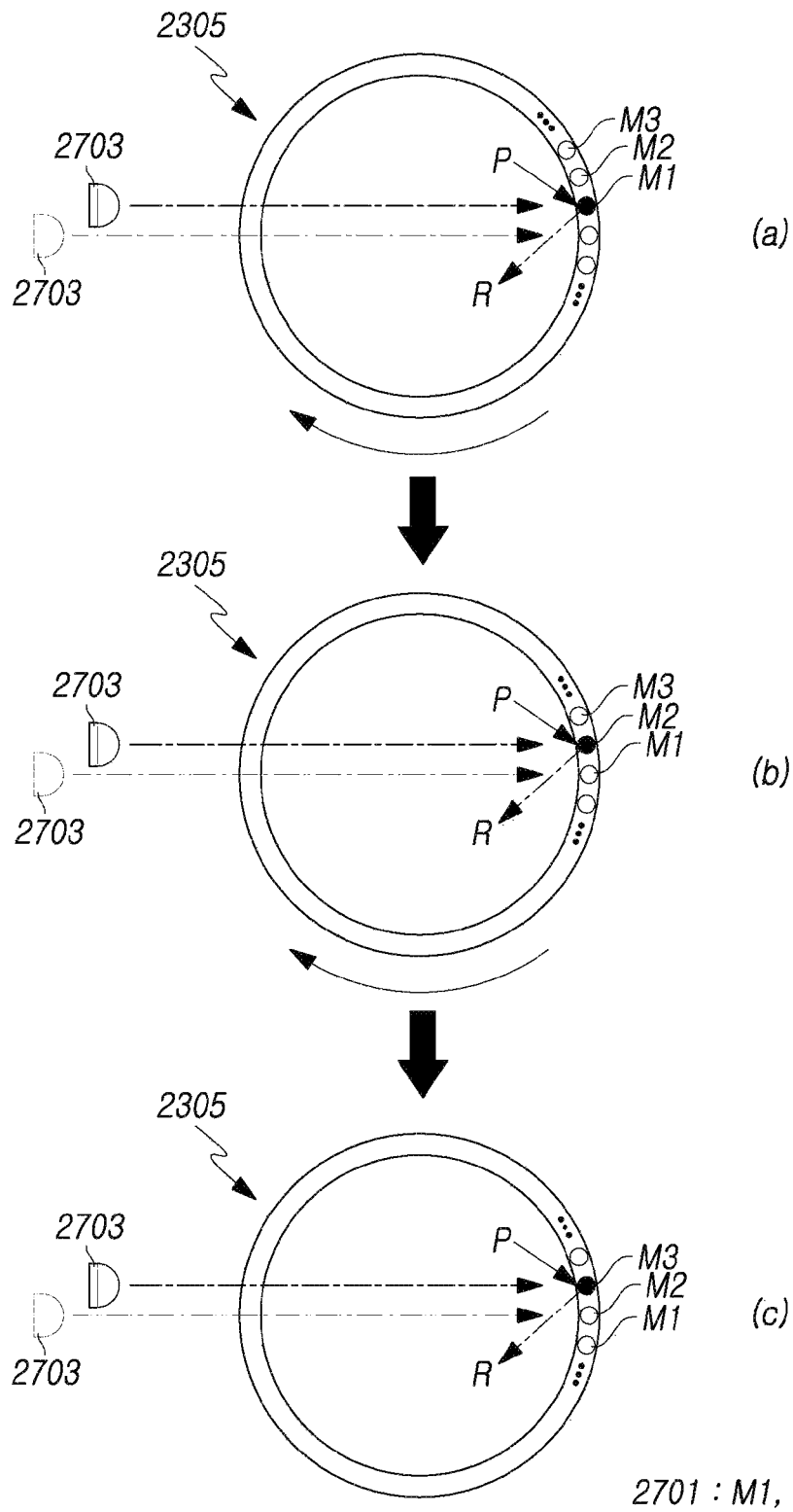
FIG. 27 is a view illustrating an operation example of a rotary module in a pet exercise system according to another embodiment of the present invention.
Figure 28:
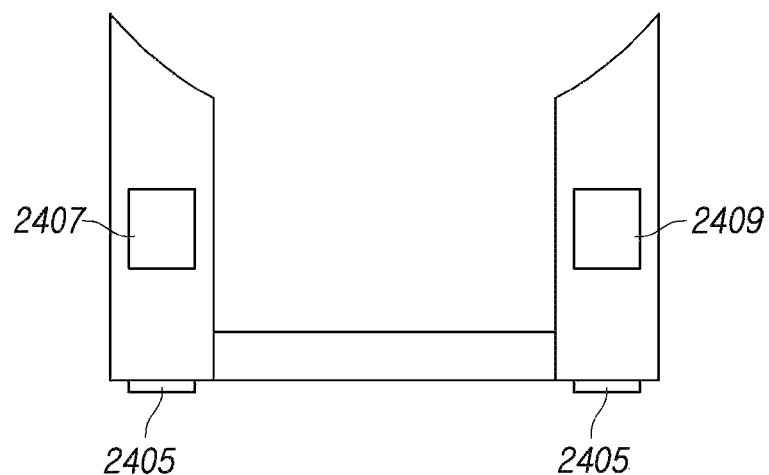
FIG. 28 is a view illustrating a support module in the pet exercise system according to the embodiment of the present invention.

As illustrated in FIG. 27, the reflective members M1, M2, M3, etc. are continuously arranged in a circumferential direction along the inner circumferential surface of the rotary module 2305, and thus, as the rotary module 2305 rotates, the reflective members M1, M2, M3, etc. passing through the predetermined position P of the inner circumferential surface of the rotary module 2305 reflect the light incident from the light source 2703 (reflected light R) and serves as a target for focusing the interest of the pet.

Of course, here, the light source 2703 may be provided as, for example, a laser light source, and according to another embodiment of the present invention, the control module 2401 may change the predetermined position P of the inner circumferential surface of the rotary module 2305 by changing a position of the light source 2703 to be emitted, or changing an angle of the light source 2703.

Subsequently, the support module 2307 supports the rotary module 2305 such that the rotary module 2305 is rotatable according to the motion of the pet.

In addition, the support module 2307 includes a weight measuring part 2405, and the weight measuring part 2405 is provided to measure the weight of the pet exercising in the rotary module 2305.

The weight measuring part 2405 is provided as, for example, a load cell.

In addition, the support module 2307 includes a speaker part 2407, and favorite music, sound, and the like of the pet may be transmitted, or a pet owner's voice may be transmitted by the speaker part 2407.

In addition, the support module 2307 includes a communication part 2409, and various control signals transmitted from a terminal 2309 to be described below are input through the communication part 2409 to be transmitted to the control module 2401, or directly transmitted to the control module 2401, and also, motion data MD of the rotary module 2305, weight information of the pet measured by the weight measurement unit 2405, and the like are transmitted to the terminal 2309 through the communication part 2409.

Here, the motion data MD of the rotary module 2305 may include, for example, data on the rotational speed of the rotary module 2305, data on a rotation distance, data on the number of turns, and the like.

Subsequently, the control module 2401 controls the operation of the gaze inducing part 2303, and the detailed description is as described above.

Meanwhile, the terminal 2309 includes a communication part 2403 that transmits an operation control signal CI of the gaze inducing part 2303 transmitted to the control module 2401.

Here, the communication part 2403 is a device capable of wireless or wired communication.

Meanwhile, the operation control signal CI is input through the touch of the display part 2411 provided in the terminal 2309.

More specifically, the operation control signal CI is input through a touch of the display part 2411, and includes a position control signal PCI for a position where the gaze inducing part 2303 emits light on the inner circumferential surface of the rotary module 2305.

In addition, the operation control signal CI is input through a touch of the display part 2411, and includes a light emitting color signal LCI for the light emitting color of the gaze inducing part 2303.

Figure 24:
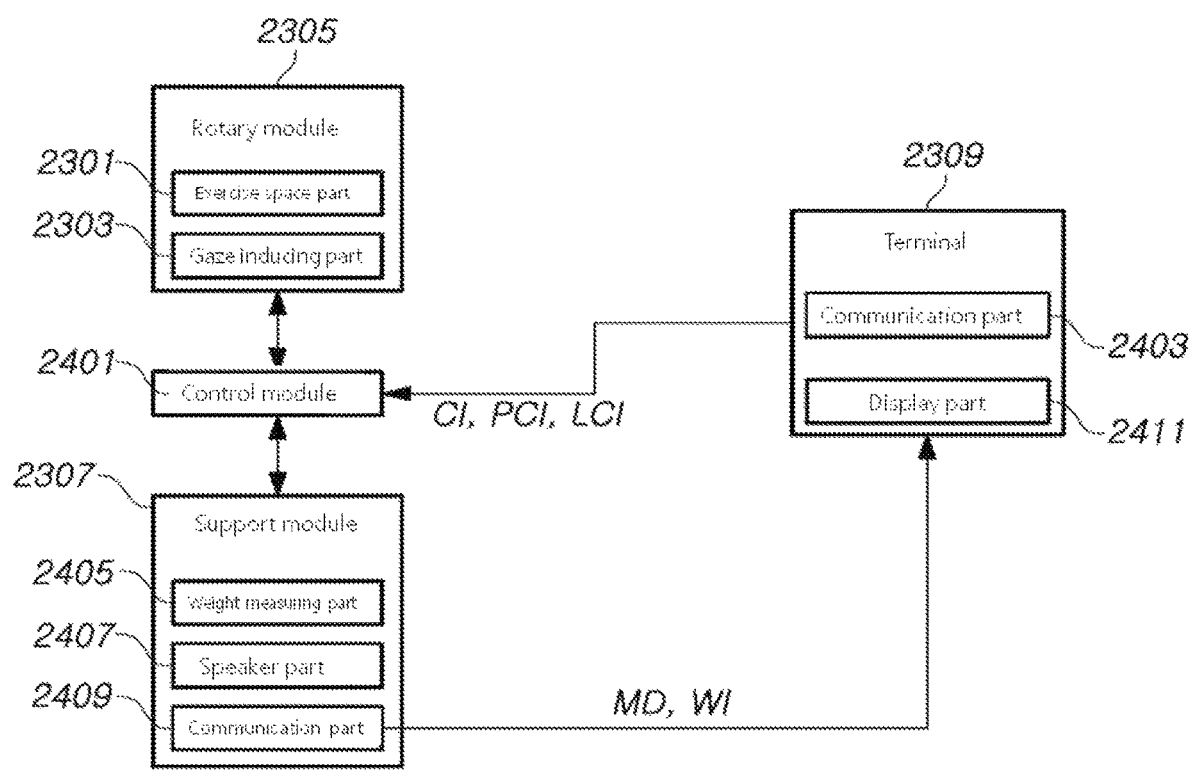
FIG. 24 is a block view illustrating the pet exercise system according to the embodiment of the present invention.
Figure 29:
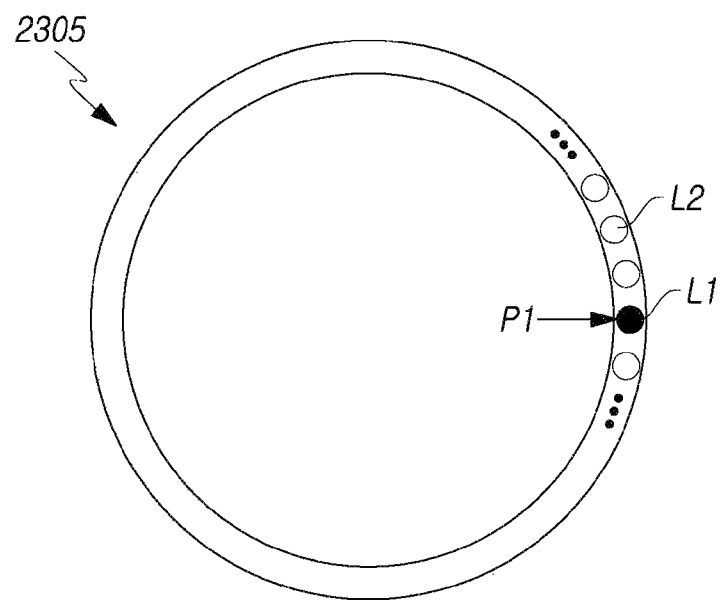
FIGS. 29 and 30 are views illustrating examples of operating a gaze inducing part of a rotary module according to an operation control signal of a terminal in the pet exercise system according to the embodiment of the present invention.
Figure 29:
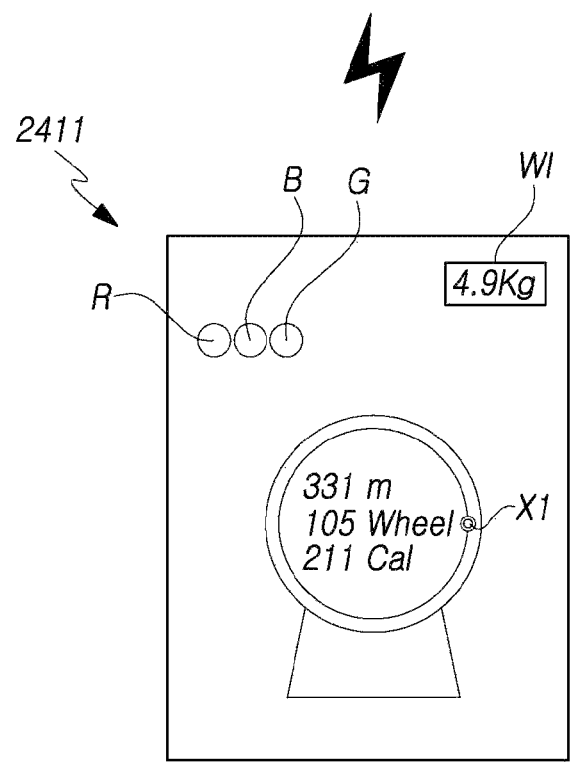
Figure 30:
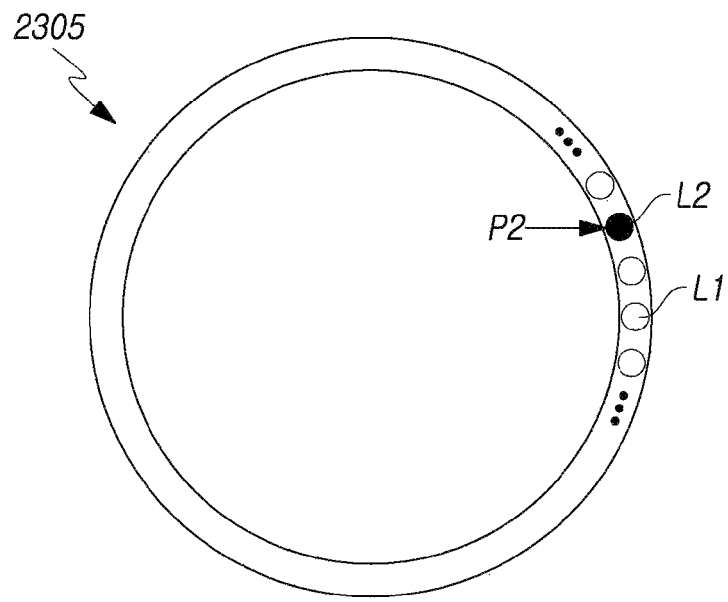
Figure 30:
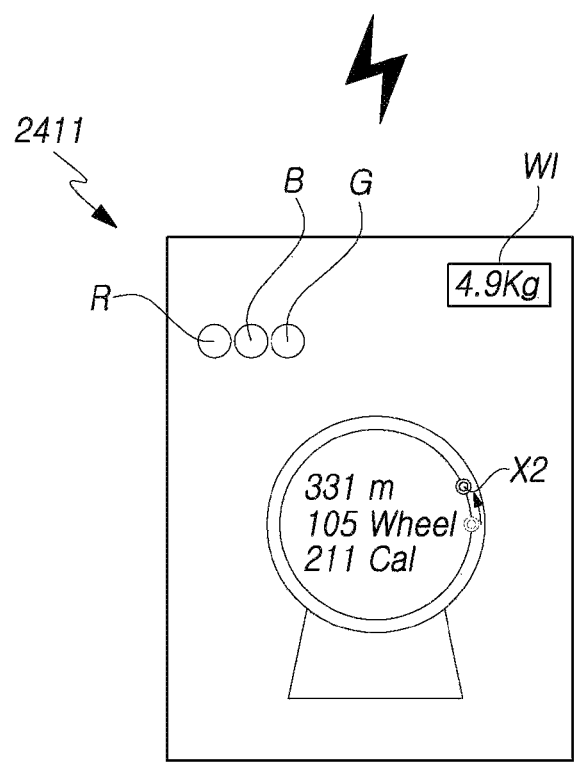
Figure 31:
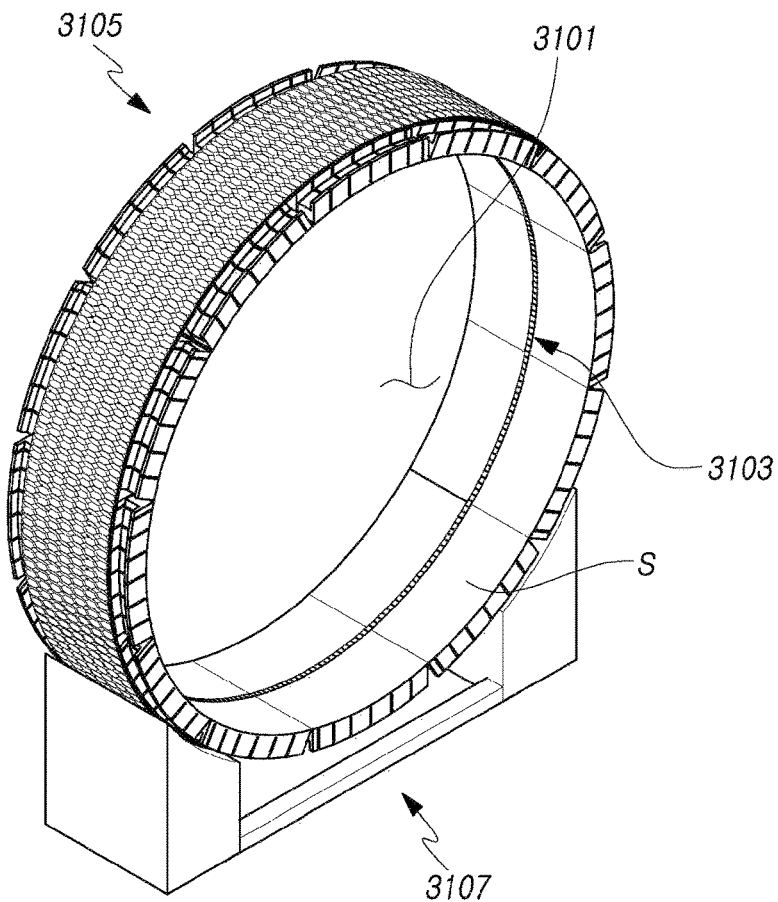
FIG. 31 is a perspective view of a pet exercise apparatus according to an embodiment of the present invention.
Figure 32:
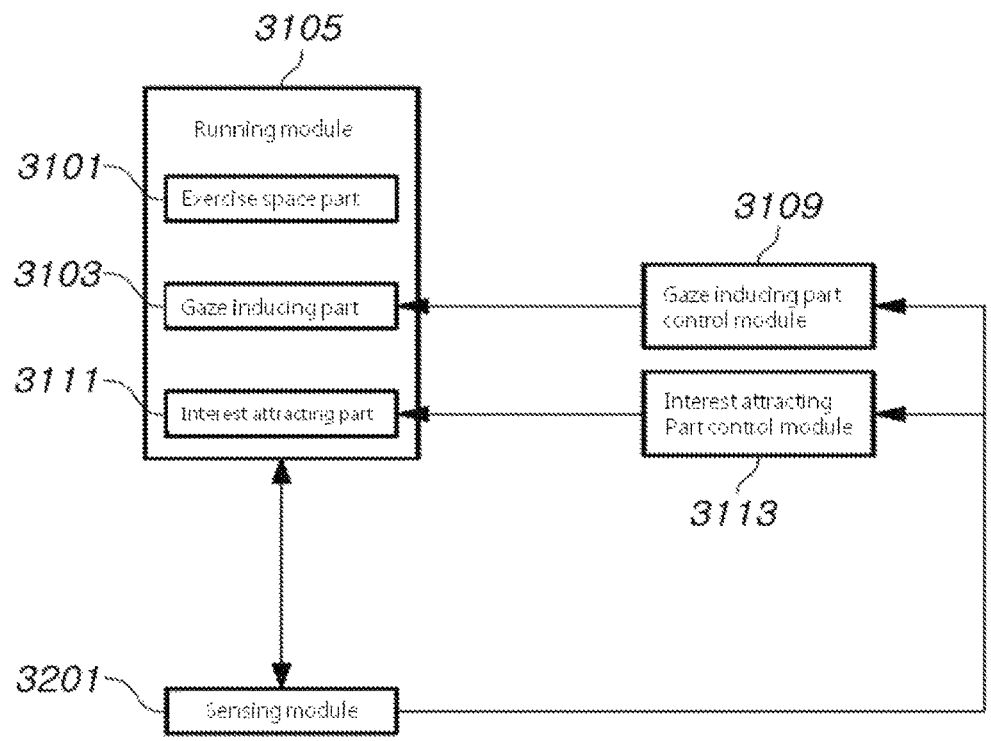
FIG. 32 is a block view illustrating a configuration of the pet exercise apparatus according to the embodiment of the present invention.
Figure 33:
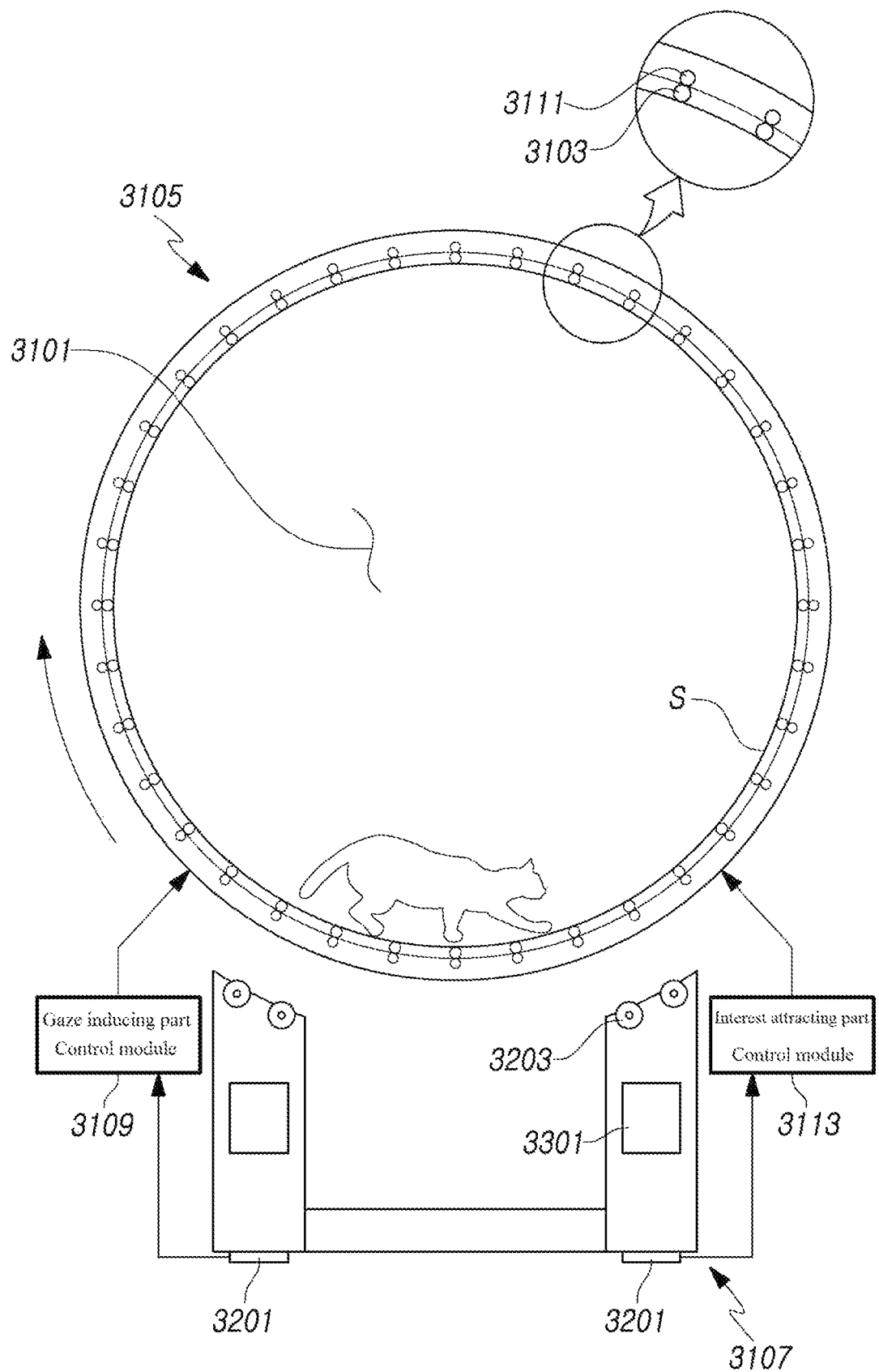
FIG. 33 is a view illustrating a configuration of the pet exercise apparatus according to the embodiment of the present invention.

When describing this with reference to FIGS. 24 and 29 to 30, the position control signal PCI input by touching a specific position X1 of the display part 2411 is transmitted to the control module 2401 through the communication part 2403, and the control module 2401 allows the gaze inducing part 2303 (more specifically, the lighting member L1) corresponding to the specific position X1 of the display part 2411 in the gaze inducing part 2303 of the rotary module 2305 to emit the light.

Thereafter, the position control signal PCI input by touching another specific position X2 of the display part 2411 is transmitted to the control module 2401 through the communication part 2403, and the control module 2401 allows the gaze inducing part 2303 (more specifically, the lighting member L2) corresponding to another specific position X2 of the display part 2411 in the gaze inducing part 2303 of the rotary module 2305 to emit the light.

Meanwhile, by touching other specific positions R, B, and G of the display part 2411, the input light emitting color signal LCI is transmitted to the control module 2401 through the communication part 2403, and the control module 2401 allows the gaze inducing part 2303 of the rotary module 2305 to emit light in colors (red R, blue B, and green G) corresponding to the light emitting color signal LCI.

Through this process, the user may freely control the operation (off or on) of the gaze inducing part 2303 of the rotary module 2305, the light emitting colors, etc. through manipulation of the terminal 2309.

Meanwhile, the display part 2411 receives and displays the motion data MD of the rotary module 2305, wherein the motion data MD of the rotary module 2305, as described above, may include data on the rotational speed, data on the rotation distance, data on the number of turns, etc., and in FIGS. 29 and 30, it is illustrated an example in which the motion data MD, particularly, the rotation distance and the number of turns of the rotary module 2305 are displayed.

Of course, the calorie consumption may also be displayed on the display part 2411 based on the weight information W1 of the pet, the rotation distance and the number of turns of the rotary module 2305, and the like.

Meanwhile, a pet exercise system 2300 according to another embodiment of the present invention is characterized by including a rotary module 2305 which has an exercise space part 2301 formed therein as a space in which the pet may exercise, and a gaze inducing part 2303 provided on an inner circumferential surface thereof and inducing a pet's gaze so that the pet continuously moves in the exercise space part 2301 and may exercise; a support module 2307 supporting the rotary module 2305 so that the rotation module 2305 is rotatable according to the motion of the pet; a control module 2401 controlling an operation of the gaze inducing part 2303; and a terminal 2309 including a display part 2305 receiving and displaying motion data MD of the rotary module 2305.

In addition, the terminal 2309 includes a communication part 2403 that transmits an operation control signal CI of the gaze inducing part 2303 transmitted to the control module 2401.

In addition, the above-described operation control signal CI is input through the touch of the display part 2411.

In addition, the operation control signal CI is input through a touch of the display part 2411, and includes a position control signal PCI for a position where the gaze inducing part 2303 emits light on the inner circumferential surface of the rotation module 2305.

In addition, the operation control signal CI is input through a touch of the display part 2411, and includes a light emitting color signal LCI for the light emitting color of the gaze inducing part 2303.

A detailed description of each configuration of a pet exercise system 2300' according to another embodiment of the present invention will be omitted.

As described above, according to the embodiment of the present invention, by inducing the gaze or attracting an interest of the pet in the exercise space part formed inside the rotary module, there is an effect that the pet continuously moves in the rotary module for a long time and may exercise.

In addition, it is possible to control the gaze inducing part of the rotary module with the operation control signal of the gaze inducing part inputted by the terminal, thereby further increasing the interest of the pet moving and exercising in the rotary module.

In addition, since the user may check the motion data of the rotary module by the terminal, there is an effect to conveniently check exercise information of the pet (information such as the rotational speed, the rotation distance, and the number of turns of the rotary module).

Meanwhile, as illustrated in FIGS. 31 to 35, a pet exercise apparatus according to an embodiment of the present invention is characterized by including a running module 3105 which includes an exercise space part 3101 formed therein as a space in which the pet may exercise and a gaze inducing part 3103 provided on an inner circumferential surface thereof and inducing a gaze of the pet while emitting light by itself so that the pet continuously moves in the exercise space part 3101 and may exercise; a support module 3107 supporting the running module 3105 so that the running module 3105 is rotatable according to the motion of the pet; and a sensing module 3201 provided in the running module 3105 or the support module 3107 and sensing the pet entering/exiting the exercise space part 3101.

The running module 3105 includes the exercise space part 3101 formed therein as a space in which the pet may exercise.

As an example, the running module 3105 is formed in an overall ring shape, and an inner space thereof is provided with the pet exercise space part 3101.

More specifically, a pet such as cat may exercise through a motion such as running or walking along an inner circumferential surface S of the running module 3105 in the exercise space part 3101, which is the inner space of the running module 3105.

The running module 3105 includes the gaze inducing part 3103 that induces a pet's gaze while emitting light by itself so that the pet continuously moves in the exercise space part 3101 and may exercise.

Here, the gaze inducing part 3103 is provided on the inner circumferential surface S of the running module 3105.

Meanwhile, the gaze inducing part 3103 may be formed of, for example, a light emitting body that is emitted by power to be supplied from the outside, and may be provided as an LED.

Subsequently, the support module 3107 supports the running module 3105 such that the running module 3105 is rotatable according to the motion of the pet.

As an example, the support module 3107 may be provided with a wheel part 3203 on the top to support the running module 3105 to be rotatable.

Further, the support module 3107 may include a communication part 3301.

Subsequently, the sensing module 3201 is provided in the running module 3105 or the support module 3107, and the sensing module 3201 performs a function of sensing a pet entering/exiting the exercise space part 3101.

The sensing module 3201 may be provided as various modules, such as a load cell module and an infrared sensor module. In the drawings, in particular, an example is illustrated, in which the sensing module 3201 is provided as a load cell module and provided in the support module 3107.

Here, when the sensing module 3201 is provided as the load cell module, the sensing module 3201 may also perform a function of measuring the weight of the pet exercising in the running module 3105, and the weight information of the pet measured by the sensing module 3201 provided in the load cell module may be transmitted to an external terminal (not illustrated) through the communication part 3301 of the support module 3107 described above.

Meanwhile, according to an embodiment of the present invention, the pet exercise apparatus further includes a gaze inducing part control module 3109 which controls the operation of the gaze inducing part 3103 so that the gaze inducing part 3103 emits light in a predetermined position or a predetermined range of the inner circumferential surface of the running module 3105 according to an entering/existing signal I of the pet transmitted from the sensing module 3201.

The gaze inducing part control module 3109 receives the entering/existing signal I of the pet from the sensing module 3201.

More specifically, when the pet enters the inside of the exercise space part 3101 of the running module 3105, the sensing module 3201 senses the entering of the pet, and accordingly, the entering/existing signal I is transmitted to the gaze inducing part control module 3109.

The gaze inducing part control module 3109, which receives the entering/existing signal, controls the operation of the gaze inducing part 3103 so that the gaze inducing part 3103 emits light in the predetermined position or the predetermined range of the inner circumferential surface of the running module 3105.

For example, the gaze inducing part control module 3109 may control the operation of the gaze inducing part 3103 such that the gaze inducing part 3103 emits light in a 4-o'clock direction, and controls the operation of the gaze inducing part 3103 so that the gaze inducing part 3103 continuously emits the light in the fixed 4-o'clock direction even if the pet reacting to the gaze inducing part 3103 moves.

Figure 34:
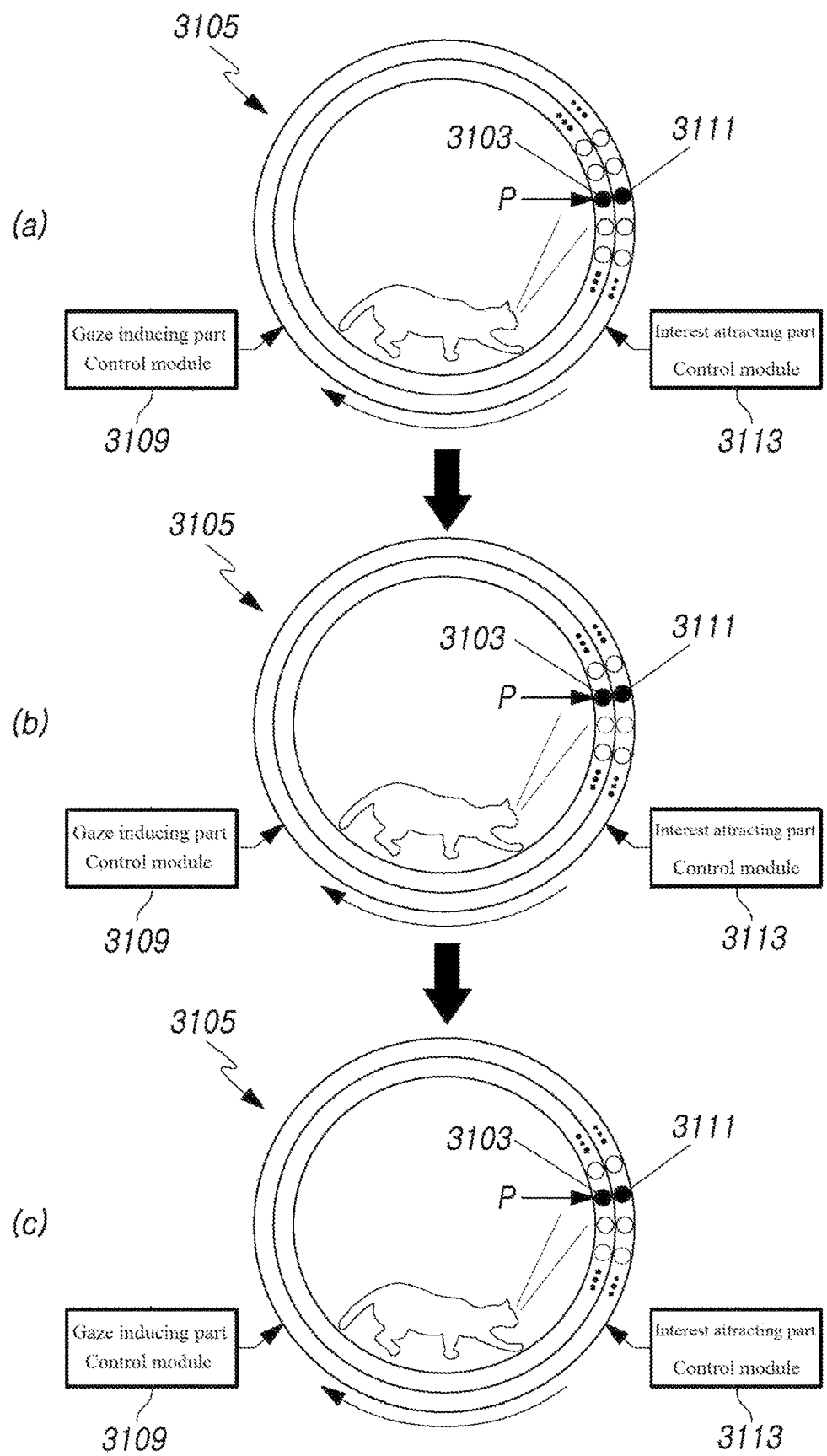
FIGS. 34 and 35 are views illustrating a process of operating a gaze inducing part and an interest inducing part sequentially in time sequence.
Figure 35:
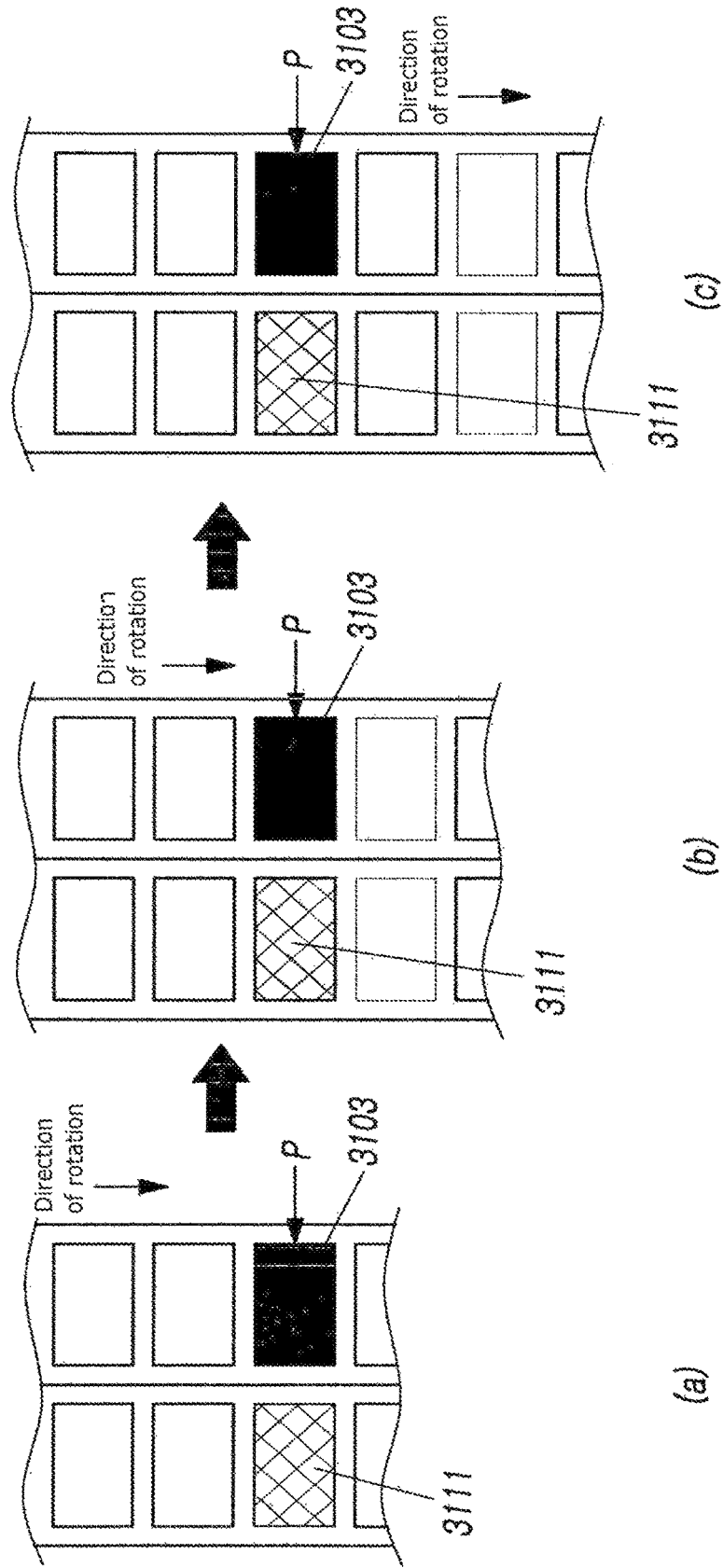

FIGS. 34 and 35 illustrate sequentially in chronological order an example in which the gaze inducing part 3103 emits the light at a predetermined position P by the gaze inducing part control module 3109.

Meanwhile, a pet exercise apparatus according to an embodiment of the present invention further includes an interest attracting part 3111 provided on the inner circumferential surface of the running module 3105, and transmitting either sound or wind to attract the interest of the pet in response to the light emission operation of the gaze inducing part 3103.

The interest attracting part 3111 may be provided as, for example, a speaker transmitting sound and a blower transmitting wind.

The interest attracting part 3111 may more improve and focus the interest of the pet exercising in the exercise space part 3101 of the running module 3105.

Further, the pet exercise apparatus according to an embodiment of the present invention further includes an interest attracting part control module 3113 which controls the operation of the interest attracting part 3111 so that the interest attracting part 3111 is operated at a position corresponding to the emission position of the gaze inducing part 3103 in the predetermined position or the predetermined range of the inner circumferential surface of the running module 3105 by the gaze inducing part control module 3109 according to the entering/existing signal I of the pet transmitted from the sensing module 3201.

The interest attracting part control module 3113 receives the entering/existing signal I of the pet from the sensing module 3201.

More specifically, when the pet enters the inside of the exercise space part 3101 of the running module 3105, the sensing module 3201 senses the entering of the pet, and accordingly, the entering/existing signal I is transmitted to the interest attracting part control module 3113.

The interest attracting part control module 3113, which receives the entering/existing signal I, controls the operation of the interest attracting part 3111 so that the interest attracting part 3111 is operated at a position corresponding to the emission position of the gaze inducing part 3103 in the predetermined position or the predetermined range of the inner circumferential surface of the running module 3105.

For example, when the gaze inducing part 3103 emits light in a 4-o'clock direction, the interest attracting part control module 3113 may control the operation of the interest attracting part 3111 so that the interest attracting part 3111 is operated in a 4-o'clock direction, and controls the operation of the interest attracting part 3111 so that the interest attracting part 3111 is continuously operated in the fixed 4-o'clock direction even if the pet moves.

FIGS. 34 and 35 illustrate sequentially in chronological order an example in which the interest attracting part 3111 is operated at a predetermined position P by the interest attracting part control module 3113.

As described above, according to an embodiment of the present invention, by inducing the gaze or attracting an interest of the pet, it is possible to allow the pet to continuously exercise in a narrow indoor space for a long time.

Further, it is possible to adjust an optimal position for emitting the light by the gaze inducing part according to a state of the pet by sensing the pet which enters/exits the inside of the exercise space part and controlling an emission position or an emission range of the gaze inducing part according to the entering/exiting signal of the pet.

Further, the pet is enabled to exercise with more focus inside the exercise space part by sensing the pet which enters/exits the inside of the exercise space part and operating the interest attracting part attracting the interest of the pet depending on the gaze inducing part controlled according to the entering/exiting signal of the pet.

While the preferred embodiments of the present invention have been illustrated and described above, the present invention is not limited to the aforementioned specific preferred embodiments, various modifications may be made by a person with ordinary skill in the technical field to which the present invention pertains without departing from the subject matters of the present invention that are claimed in the claims, and these modifications are included in the scope of the claims.

The invention claimed is:

1. A pet exercise apparatus comprising:
a rotary housing which has an exercise space part formed therein so that the pet may exercise and has a light discharge hole; a support housing covering an outside of the rotary housing; a rotary support member provided between the rotary housing and the support housing to support the rotational motion of the rotary housing; and a light emitting module that transmits light to the inside of the rotary housing through the light discharge hole, wherein the light emitting module includes a case part protruding transparently or translucently from the inner circumferential surface of the support housing; and a light emitting medium part filled in the case part to generate light.

* * * * *